United States Patent
Shimizu et al.

(10) Patent No.: US 6,882,954 B2
(45) Date of Patent: Apr. 19, 2005

(54) ANALYTICAL MESH PREPARATION APPARATUS, ANALYTICAL MESH PREPARATION METHOD, AND ANALYTICAL MESH PREPARATION PROGRAM

(75) Inventors: Koichi Shimizu, Kawasaki (JP); Akira Ueda, Kawasaki (JP); Kenichiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 10/322,597

(22) Filed: Dec. 19, 2002

(65) Prior Publication Data

US 2003/0144812 A1 Jul. 31, 2003

(30) Foreign Application Priority Data

Jan. 31, 2002 (JP) ........................... 2002-024188
Aug. 30, 2002 (JP) ........................... 2002-254040

(51) Int. Cl.[7] ............................................. G06F 15/00
(52) U.S. Cl. ............................................... 702/150
(58) Field of Search ..................... 702/94, 95, 97, 702/99, 130, 150, 152, 153, 155, 156, 158; 700/90, 96–98, 299, 300, 302, 303; 703/2, 5

(56) References Cited

U.S. PATENT DOCUMENTS

2003/0052875 A1 * 3/2003 Salomie ..................... 345/419

FOREIGN PATENT DOCUMENTS

| EP | 0 881 585 A1 | 12/1998 |
|---|---|---|
| JP | 10-334276 | 12/1998 |
| JP | 2001-099748 | 4/2001 |

\* cited by examiner

Primary Examiner—Michael Nghiem
(74) Attorney, Agent, or Firm—Staas & Halsey LLP

(57) ABSTRACT

An analytical mesh preparation apparatus, an analytical mesh preparation method and an analytical mesh preparation program are provided which are capable of preparing a mesh in such a manner as to improve calculation accuracy and shorten the calculation time as well. Upon preparation of an analytical mesh by arranging grid lines in an analytical area to analyze prescribed physical quantities for an object composed of a plurality of parts, grid lines are first arranged at corners of the parts, and the intervals between adjacent ones of the grid lines are calculated. Based on the calculation result, the grid lines to be removed are determined, as a result of which the grid lines thus determined are removed. The shapes or sizes of the parts are changed in accordance with the removal of the grid lines.

25 Claims, 25 Drawing Sheets

Part information

Part number: ID

Part type: plate or hexahedron

Part contour coordinates: starting point (X0, Y0, Z0) and end point (X1, Y1, Z1)

Specific heat and heat transfer coefficient = a, b

50 Part
60 Grid
70 Grid line

Information on grids parallel to y-z plane

Grid number: ID

Part number : $ID_1$, $ID_2$, $ID_3$ ···

Part side number: 0 or 1

Plane (grid line) parallel to X axis is along a side of part A.

Similar in z-x plane (direction Y) and x-y plane (direction Z)

Fig. 13
|  |  | Changeable (permission or non-permission) |
|---|---|---|
| Geometrical shape change | Shape or size change | ○ |
| Topological change | Hexahedron → plane (plane → line in two dimensions) | ○ |
| | Hexahedron → line or point (point in two dimensions) | × |
Fig. 14
|  | Item to be checked |
|---|---|
| Grid removal is made for all parts. |  |
| Mutually contacting or intersecting grids are excluded from objects for grid removal. | ○ |
Fig. 15
Fig. 16
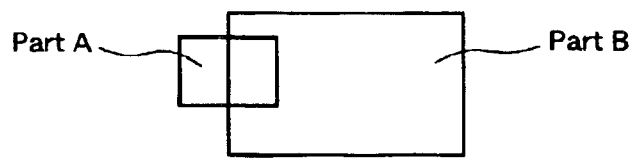
Fig. 17
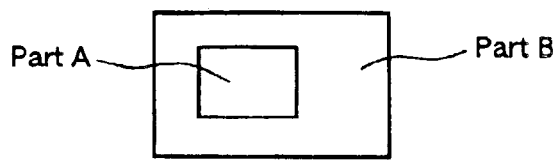

Grid lines to be removed

Grid lines to be removed

Grid lines to be removed

------- Intermediate grid lines

⊟ ---- ☐ lower_unit_asy_asm_asy
  ├-- ☐ lower unit asy asm part 0
  ├-- ☐ lower unit asy asm part 1
  ├-- ☐ lower unit asy asm part 2
  └-- ☐ lower unit asy asm part 3

☐ lower unit asy asm part 0
  ├-- x
  ├-- y
  ├-- z
  └-- auto

ANALYTICAL MESH PREPARATION APPARATUS, ANALYTICAL MESH PREPARATION METHOD, AND ANALYTICAL MESH PREPARATION PROGRAM

BACKGROUND OF THE INVENTION

1. Field of the Invention

The present invention relates to an analytical mesh preparation apparatus, an analytical mesh preparation method and an analytical mesh preparation program for preparing a mesh (lattice) for use with analysis, and in particular, it relates to an analytical mesh preparation apparatus, an analytical mesh preparation method and an analytical mesh preparation program for preparing a mesh used for thermal or fluid analysis by changing the shape, size or arrangement of each part which constitutes an analysis model.

2. Description of the Prior Art

As known in Japanese Patent Laid Open No. 10-334276 specification, for example, thermal and fluid analyses are generally carried out by using a finite volume method, which is based on a mesh prepared in an analysis range. In this case, it is general to prepare a mesh by setting mesh points or grids at all the corners or vertices of parts or elements which constitute an analysis model. Here, note that in the description which follows, a grid refers to a point or node of a mesh, and a mesh component refers to a cell or a rectangular or hexahedral element defined by lines passing through grids.

However, with such a conventional technique, there have often been created totally unbalanced mesh configurations such as those including extremely fine or narrow mesh components or large or wide mesh components, thus giving rise to a problem of remarkable reduction in calculation accuracy. In addition, there also arises another problem in that the number of mesh components increases extremely depending upon the arrangements of parts, resulting in a lot of increase in the calculation time.

SUMMARY OF THE INVENTION

The present invention has been made in view of the circumstances as referred to above, and has for its object to provide an analytical mesh preparation apparatus, an analytical mesh preparation method and an analytical mesh preparation program which are capable of preparing a mesh in such a manner as to improve calculation accuracy and shorten the calculation time as well.

To solve the above-mentioned problem, according to a first aspect of the present invention, there is provided an analytical mesh preparation apparatus for preparing an analytical mesh by arranging grid lines in an analytical area to analyze prescribed physical quantities for an object composed of a plurality of elements. The apparatus includes: first grid line arranging unit for arranging grid lines at corners of the plurality of elements; interval calculation unit for calculating the intervals between adjacent ones of the plurality of grid lines arranged by the first grid line arranging unit; first determining unit for determining those grid lines which are to be removed based on the result of the calculation carried out by the interval calculation unit; removal unit for removing the grid lines based on the result of the determination made by the first determining unit; and changing unit for changing at least one of the shapes and sizes of the elements in accordance with the removal of the grid lines by the removal unit.

With the above configuration, only those mesh components which are determined as being able to be removed are deleted, and hence it becomes possible to reduce the total number of mesh components while leaving the mesh components necessary for analysis, thus improving calculation accuracy in the analysis as well as shortening the calculation time. Here, note that the above-mentioned size represents any one of a length, an area or a volume. In addition, the above-mentioned shape change performed by the changing unit includes a two-dimensional change in shape, a three-dimensional change in shape, a topological change such as a change from a three-dimensional shape to a two-dimensional or planar shape, etc. In an embodiment, the first grid line arranging unit and the removal unit are constituted by a first grid line setting part. The interval calculation unit and the first determining unit are constituted by a grid line removal determining part, and the changing unit is constituted by a part changing part.

Preferably, the analytical mesh preparation apparatus further includes conversion unit for converting the shapes of the elements into hexahedrons each of which circumscribes a corresponding one of the elements. The first grid line arranging unit arranges the grid lines at corners of the elements converted into the hexahedrons by the conversion unit. Preferably, when the elements are constituted by one or more polygons, the conversion unit acquires the maximum and minimum coordinates of each of the polygons in the directions of three orthogonal axes and forms, as the hexahedrons circumscribing the corresponding elements, hexahedrons with the maximum and minimum coordinates as their vertices.

According to these configurations, it is possible to properly arrange grids for an analysis model which consists of distorted elements or elements having no corners. In addition, a mesh suitable for an analysis can be prepared. In an embodiment, the conversion unit is constituted by a part shape setting part.

Preferably, the first determining unit determines, as a grid line to be removed, one of each pair of grid lines whose interval is equal to or smaller than a prescribed value. Preferably, the first determining unit determines, as a grid line to be removed, that one of each pair of grid lines whose interval (i.e., the distance between paired grid lines) is equal to or smaller than the prescribed value, which is formed by a smaller one of the elements from which the pair of grid lines are formed.

According to these configurations, only the grid lines formed by the elements of small sizes are removed, so the total number of mesh components can be reduced without influencing the analytical results to any practical extent.

Preferably, the analytical mesh preparation apparatus further includes second determining unit for determining the grid lines which are to be removed based on prescribed information on the elements. The removal unit removes the grid lines based on the result of the determination made by the second determining unit in addition to the result of the determination made by the first determining unit. Preferably, the prescribed information on the elements includes size information on the sizes of the elements or arrangement information on the arrangements of the elements.

According to such configurations, for instance, the grid lines formed by the elements of large sizes can be excluded from the objects to be removed since the removal thereof might have a great influence. In addition, in cases where a plurality of elements are arranged in contact with each other, heat conduction due to the mutual contact thereof greatly influences analytical results in a thermal or fluid analysis. Thus, accuracy in the analytical results might be deteriorated by the removal of the grid lines. With the above configurations, however, those elements which have such an arrangement relation with respect to each other can be excluded from the objects of grid line removal. In an embodiment, the second determining unit is constituted by a part change determining part.

Preferably, the analytical mesh preparation apparatus further includes second grid line arranging unit for arranging, after changing of at least one of the shapes and sizes of the elements, additional grid lines in such a manner that all the grid lines are arranged at equal intervals or differences in the intervals between adjacent ones of all the grid lines are within a prescribed range.

Thus, analytical accuracy can be greatly improved according to such a configuration because the mesh components defined by the grid lines can be arranged evenly in an analytical area with each mesh component having a substantially uniform area or volume. In an embodiment, the second grid line arranging unit is constituted by a second grid line setting part.

Preferably, the analytical mesh preparation apparatus further includes specific heat changing unit for changing the specific heat of each of the elements of which at least one of the shapes and sizes have been changed by the changing unit in such a manner that the thermal capacity of each of the elements becomes the same before and after the changing thereof. Preferably, the analytical mesh preparation apparatus further includes heat transfer coefficient changing unit for changing the heat transfer coefficient of each of the elements of which at least one of the shapes and sizes have been changed by the changing unit in such a manner that the amount of heat transmission of each of the elements becomes the same before and after the changing thereof.

According to such configurations, even if the shapes or sizes of the elements are changed, the thermal capacity or the amount of heat transmission thereof will not change before and after changing of their shapes or sizes, thus making it possible to particularly prevent reduction in accuracy of the analytical results obtained in a thermal or fluid analysis. In an embodiment, the specific heat changing unit and the heat transfer coefficient changing unit are constituted by a specific heat and heat transfer coefficient changing part.

According to a second aspect of the present invention, there is provided an analytical mesh preparation apparatus for preparing an analytical mesh by arranging grid lines in an analytical area to analyze prescribed physical quantities for an object composed of a plurality of elements. The apparatus includes: first grid line arranging unit for arranging grid lines at corners of the plurality of elements; interval calculation unit for calculating the intervals between adjacent ones of the plurality of grid lines arranged by the first grid line arranging unit; first determining unit for determining those grid lines which are to be removed based on the result of the calculation carried out by the interval calculation unit; removal unit for removing the grid lines based on the result of the determination made by the first determining unit; and arrangement changing unit for changing the arrangements of the elements in accordance with the removal of the grid lines by the removal unit.

According to such a configuration, it is possible to remove only the mesh components that may be removed. Accordingly, the number of total mesh components can be reduced so that in a thermal or fluid analysis, etc., for instance, the calculation time is shortened and accuracy in the analytical results can be improved. In an embodiment, the arrangement changing unit is constituted by a part changing part or a final part changing part.

In addition, in the analytical mesh preparation apparatus of the present invention, the changing unit may be constituted such that only shapes are changed without changing areas or volumes of the elements in accordance with removal of grid lines by the removal unit. According to this configuration, removal of mesh elements can be realized without changing areas or volumes of elements and deteriorating analytical accuracy. In this case, the elements of which only shapes are changed by the changing unit without changing areas or volumes thereof are designated based on designation information. Further, the analytical mesh preparation apparatus can be provided with input designation unit for inputting the designation information.

In addition, in the analytical mesh preparation apparatus of the present invention, preferably, the first determining unit determines, as grid lines to be removed, grid lines that form intervals of grid lines formed in a prescribed coordinate axis direction among a plurality of grid lines arranged for one element, and the changing unit changes a length of the element in other coordinate axis directions perpendicular to the prescribed coordinate axis direction in order to maintain an area or a volume of the element in accordance with change of the length of the element in a direction of the intervals of grid lines which arise along with the removal of the grid lines. In this case, preferably, in the case in which the length of the element is changed in the other coordinate axis directions, if there are at least two other coordinate axis directions and, in one coordinate axis direction thereof, there are grid lines of another element matching corners of the element, the changing unit changes the length of the element in the other coordinate axis direction different from the one coordinate axis direction.

Further, preferably, the first determining unit determines the prescribed coordinate axis direction based on the intervals of grid lines calculated by the interval calculation unit. Alternatively, preferably, the first determining unit determines the prescribed coordinate axis direction based on designated information. Note that, preferably, the element is a part or a space relating to a heat flow path.

According to a third aspect of the present invention, there is provided an analytical mesh preparation method for preparing an analytical mesh by arranging grid lines in an analytical area to analyze prescribed physical quantities for an object composed of a plurality of elements. The method includes: a grid line arranging step of arranging grid lines at corners of the plurality of elements; an interval calculation step of calculating the intervals between adjacent ones of the plurality of grid lines arranged in the first grid line arranging step; a determining step of determining those grid lines which are to be removed based on the result of the calculation carried out in the interval calculation step; a removal step of removing the grid lines based on the result of the determination made in the determining step; and a changing step of changing at least one of the shapes and sizes of the elements in accordance with the removal of the grid lines in the removal step.

According to a fourth aspect of the present invention, there is provided an analytical mesh preparation method for preparing an analytical mesh by arranging grid lines in an analytical area to analyze prescribed physical quantities for an object composed of a plurality of elements. The method includes: a grid line arranging step of arranging grid lines at corners of the plurality of elements; an interval calculation step of calculating the intervals between adjacent ones of the plurality of grid lines arranged in the first grid line arranging step; a determining step of determining those grid lines which are to be removed based on the result of the calculation carried out in the interval calculation step; a removal step of removing the grid lines based on the result of the determination made in the determining step; and an arrangement changing step of changing the arrangements of the elements in accordance with the removal of the grid lines in the removal step.

In addition, according to a fifth aspect of the present invention, there is provided an analytical mesh preparation method for preparing an analytical mesh by arranging grid lines in an analytical area to analyze prescribed physical quantities for an object composed of a plurality of elements. The method includes: a grid line arranging step of arranging grid lines at corners of the plurality of elements; an interval calculating step of calculating the intervals between adjacent ones of the plurality of grid lines arranged by the grid line arranging step; a determining step of determining those grid lines which are to be removed based on the result of the calculation carried out by the interval calculating step; a removing step of removing the grid lines based on the result of the determination made by the determining step; and a changing step of changing only the shapes without changing areas or volumes of the elements in accordance with the removal of the grid lines by the removing step.

According to a sixth aspect of the present invention, there is provided an analytical mesh preparation program for making a computer perform the processing of preparing an analytical mesh by arranging grid lines in an analytical area to analyze prescribed physical quantities for an object composed of a plurality of elements. The program is adapted to make the computer execute: a grid line arranging step of arranging grid lines at corners of the plurality of elements; an interval calculation step of calculating the intervals between adjacent ones of the plurality of grid lines arranged in the grid line arranging step; a determining step of determining those grid lines which are to be removed based on the result of the calculation carried out in the interval calculation step; a removal step of removing the grid lines based on the result of the determination made in the determining step; and a changing step of changing at least one of the shapes and sizes of the elements in accordance with the removal of the grid lines in the removal step.

Further, this program can be stored in a computer readable storage medium. As the storage medium, there are portable storage media such as a CD-ROM, a flexible disk, a DVD disk, a magneto-optical disk and an IC card, a database for holding a computer program, and the like.

According to a seventh aspect of the present invention, there is provided an analytical mesh preparation program for making a computer perform the processing of preparing an analytical mesh by arranging grid lines in an analytical area to analyze prescribed physical quantities for an object composed of a plurality of elements. The program is adapted to make the computer execute: a grid line arranging step of arranging grid lines at corners of the plurality of elements; an interval calculation step of calculating the intervals between adjacent ones of the plurality of grid lines arranged in the grid line arranging step; a determining step of determining those grid lines which are to be removed based on the result of the calculation carried out in the interval calculation step; a removal step of removing the grid lines based on the result of the determination made in the determining step; and an arrangement changing step of changing the arrangements of the elements in accordance with the removal of the grid lines in the removal step.

Moreover, according to a eighth aspect of the present invention, there is provided an analytical mesh preparation program for causing a computer to execute processing for preparing an analytical mesh by arranging grid lines in an analytical area to analyze prescribed physical quantities for an object composed of a plurality of elements. The program causes the computer to execute: a grid line arranging step of arranging grid lines at corners of the plurality of elements; an interval calculating step of calculating the intervals between adjacent ones of the plurality of grid lines arranged by the grid line arranging step; a determining step of determining those grid lines which are to be removed based on the result of the calculation carried out by the interval calculating step; a removing step of removing the grid lines based on the result of the determination made by the determining step; and a changing step of changing only the shapes without changing areas or volumes of the elements in accordance with the removal of the grid lines by the removing step.

BRIEF DESCRIPTION OF THE DRAWINGS

FIGS. 11(a) and 11(b) are graphical representations prepared by a grid line removal determining part, wherein FIG. 11(a) is a graph showing the volumes of respective parts and FIG. 11(b) is a graph showing reciprocals of grid intervals.

FIGS. 12(a) and 12(b) are graphical representations when a bar for reciprocals of grid intervals is selected by a mouse or the like.

FIG. 13 is a table showing one example of the condition designation of geometrical and topological changes.

FIG. 14 is a table showing one example of condition settings for grid removal when parts are in contacting and intersecting relations with respect to each other.

FIG. 15 is a view showing a type of arrangement in which part A is in contact with part B.

FIG. 16 is a view showing a type of arrangement in which part A intersects part B.

FIG. 17 is a view showing a type of arrangement in which part A is present inside part B.

DESCRIPTION OF THE PREFERRED EMBODIMENTS

Now, preferred embodiments of the present invention will be described in detail while referring to the accompanying drawings.

Embodiment 1

A first embodiment of the present invention discloses a mesh preparation apparatus in which grids are arranged at all the corners or vertices of elements (hereinafter referred to as parts) which constitute an analysis object, and some of the grids thus arranged are selectively deleted or removed by changing at least one of the shapes and sizes of parts according to a prescribed condition, thereby reducing the number of mesh components used for analysis.

Figure 1:
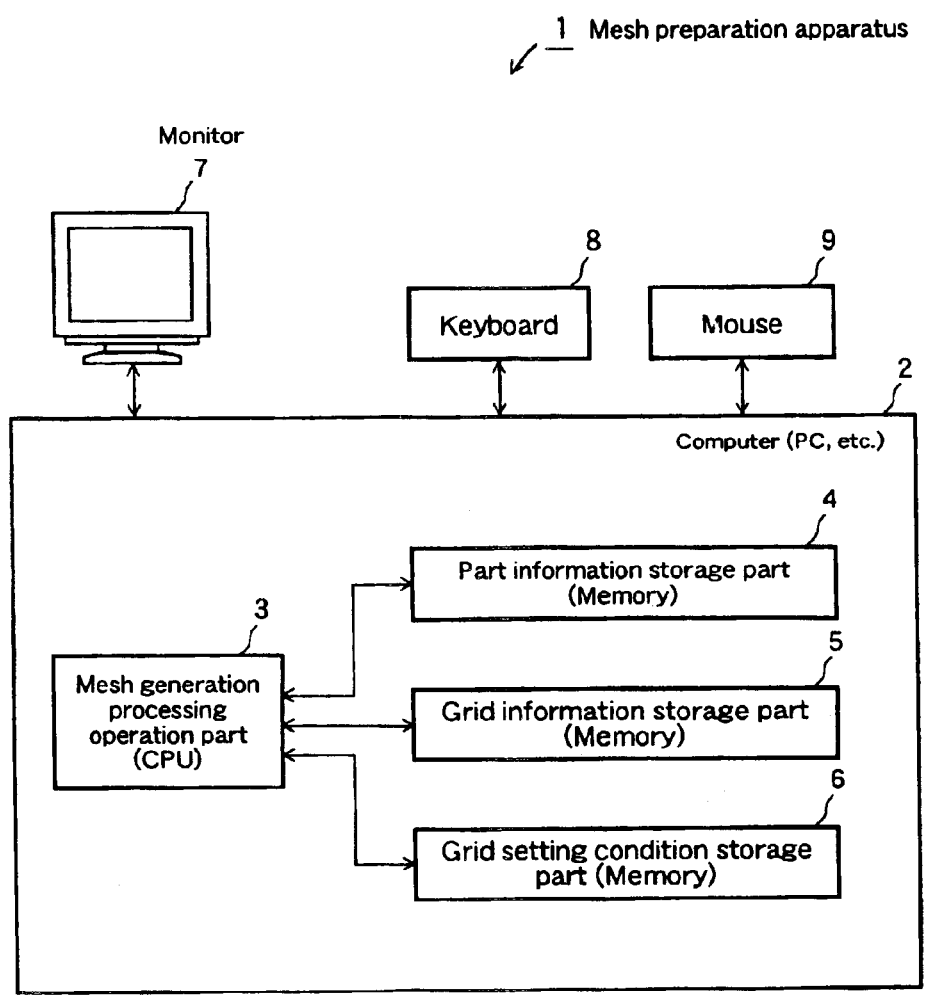
FIG. 1 is a block diagram showing the overall configuration of a mesh preparation apparatus according to a first embodiment of the present invention.

FIG. 1 is a block diagram which shows the overall configuration of the mesh preparation apparatus according to the first embodiment of the present invention. As illustrated in this figure, the mesh preparation apparatus 1 includes a computer 2 such as a personal computer (PC), a monitor 7 for displaying the results of processing carried out by the computer 2, a keyboard 8 and a mouse 9 for inputting various data, instructions and the like to the computer 2. Also, the computer 2 includes a mesh generation processing operation part (CPU) 3, a part information storage part 4 for storing a variety of pieces of information on respective parts, a grid information storage part 5 for storing information about grids prepared, and a grid setting condition storage part 6 for storing grid setting conditions. Here, note that the part information storage part 4, the grid information storage part 5 and the grid setting condition storage part 6 are assumed to be a part of a memory or a storage device incorporated in the computer 2.

Figure 2:
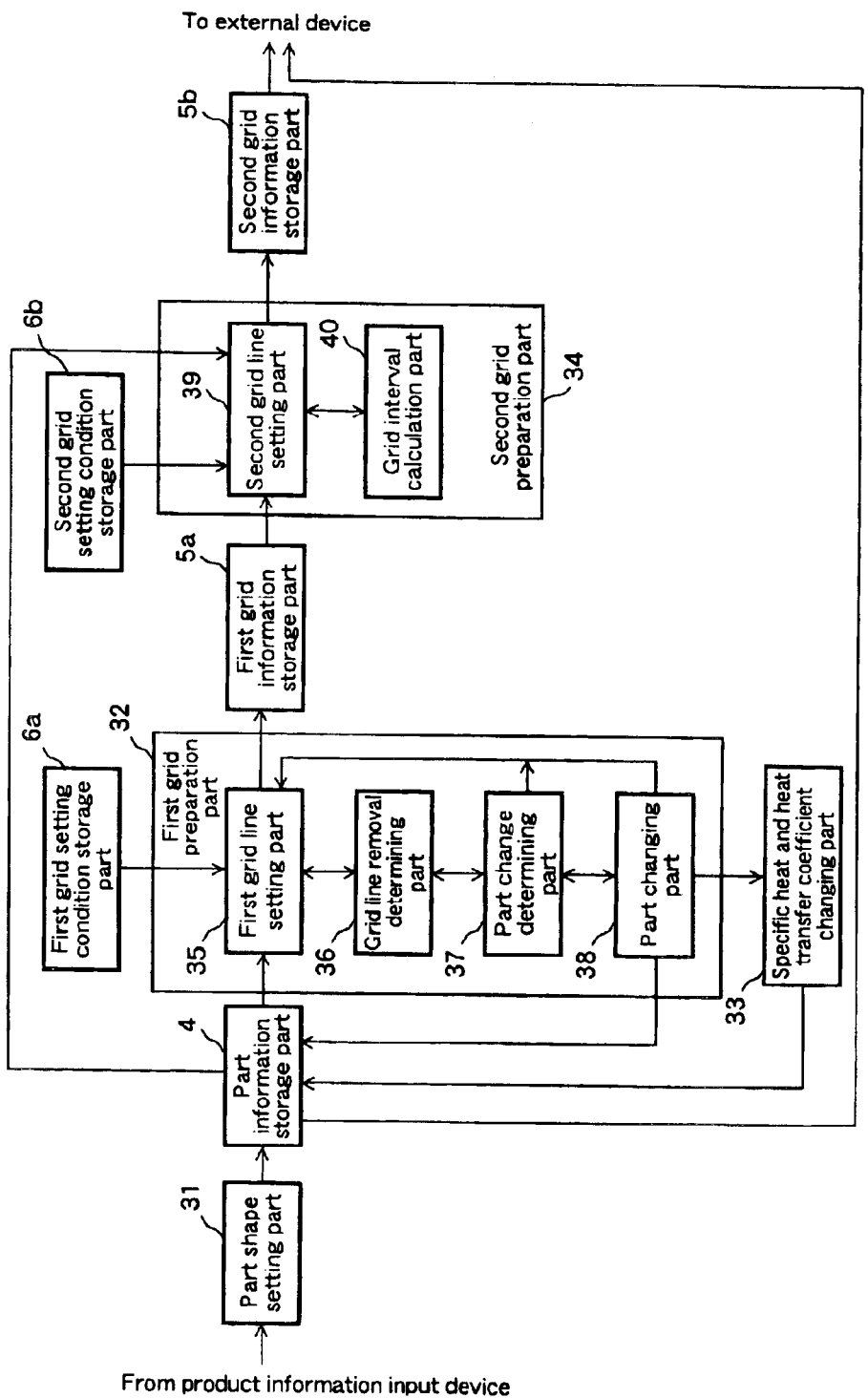
FIG. 2 is a block diagram showing in more detail the configuration of a computer employed in the mesh preparation apparatus.

FIG. 2 is a block diagram which illustrates the internal configuration of the computer 2 of FIG. 1 in more detail. The mesh generation processing operation part 3 shown in FIG. 1 includes a part shape setting part 31, a first grid preparation part 32, a specific heat and heat transfer coefficient changing part 33, and a second grid preparation part 34, as illustrated in FIG. 2. Also, the grid information storage part 5 shown in FIG. 1 includes a first grid information storage part 5a and a second grid information storage part 5b. The grid setting condition storage part 6 shown in FIG. 1 includes a first grid setting condition storage part 6a and a second grid setting condition storage part 6b.

Here, note that if an analysis model is constituted by parts of non-hexahedral shapes, the part shape setting part 31 converts the parts of the analysis model into hexahedrons and sets them as the shapes of the parts. Information on each part to be subjected to such shape setting processing is input from a product information input device such as the keyboard 8, the mouse 9 or the like. In addition, the first grid preparation part 32 prepares a mesh defined by grid lines of the initial stage, and the second grid preparation part 34 prepares a mesh of uniformly sized mesh components by adding further grids and grid lines (hereinafter referred to as intermediate grids and intermediate grid lines) to the mesh created from the grid lines set by the first grid preparation part 32. Concretely, the intermediate grid lines are arranged at intergrid distances or intervals between adjacent grid lines which are made as equal as possible to each other, that is, for example, in case of a two-dimensional mesh, mesh components are arranged to form shapes as close as possible to squares. As a result, the offsets (nonuniformities or distortions) of the mesh components can be corrected and analytical results with higher accuracy can be obtained.

The first grid preparation part 32 includes a first grid line setting part 35 for setting grid lines of the initial stage, a grid line removal determining part 36 for determining the grid lines which are to be removed from among the grid lines set by the first grid line setting part 35, a part change determining part 37 for determining whether the shape and/or size of each part is to be changed, and a part changing part 38 for changing the shape and/or size of each part based on the determination of the grid line removal determining part 36 and the determination of the part change determining part 37. These respective components perform processing based on the conditions stored in the first grid setting condition storage part 6a. The grid information prepared by the first grid preparation part 32 is stored in the first grid information storage part 5a.

In addition, when the shape and/or size of a part is changed by the part changing part 38, the specific heat and heat transfer coefficient changing part 33 calculates and sets the specific heat and the heat transfer coefficient of the changed part in such a manner that such a change may not affect the analytical result, that is, the thermal capacity and the amount of heat transmission of the changed part may not be varied thereby. The settings thus changed are stored in the part information storage part 4.

The second grid preparation part 34 includes a second grid line setting part 39 for setting intermediate grid lines, and a grid interval calculation part 40 for calculating grid intervals (intervals or distances between adjacent grid lines). These constitutive component parts carry out processing based on the conditions stored in the second grid setting condition storage part 6b and the grid information stored in the first grid information storage part 5a. The grid information at the end of the processing according to the second grid preparation part 34 is stored in the second grid information storage part 5b.

The grid information thus derived and the part information with the specific heat and the heat transfer coefficient changed are output to an external unit (analyzing apparatus) so as to be used for thermal or fluid simulations, etc.

Figure 3:
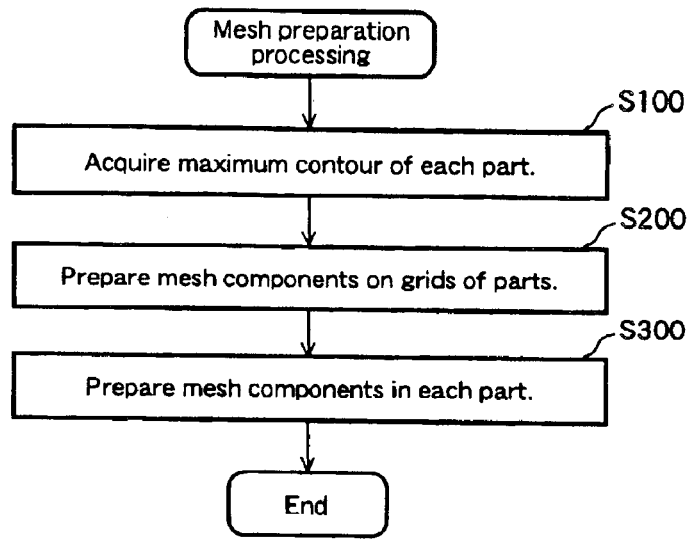
FIG. 3 is a flow chart showing in detail the mesh preparing operation of the mesh preparation apparatus.

In view of the configuration of the mesh preparation apparatus 1 as described above, the flow of processing thereof will be explained below in detail while using flow charts illustrated in the accompanying drawings. FIG. 3 is a flow chart showing the flow of the mesh preparing operation of the mesh preparation apparatus 1. In this first embodiment, first of all, the processing of converting all the parts constituting an analysis model into hexahedrons is carried out as an initial stage. This processing is to enable grids to be set for distorted or curved parts or parts having no edge or corner. Minimum circumscribed hexahedrons (maximum contours) for such parts are derived and set as the shapes of the parts (step S100). This processing is carried out by the part shape setting part 31.

The part shape setting part 31 first acquires from the product information input device or the like information such as the coordinate position, the specific heat and the heat transfer coefficient, etc., of each of the parts constituting the analysis model. The part shape setting part 31 performs part shape setting processing (maximum contour acquisition processing) by using the coordinate position of each part. Here, note that a part number for identifying each part is attached to the part information.

Figure 4:
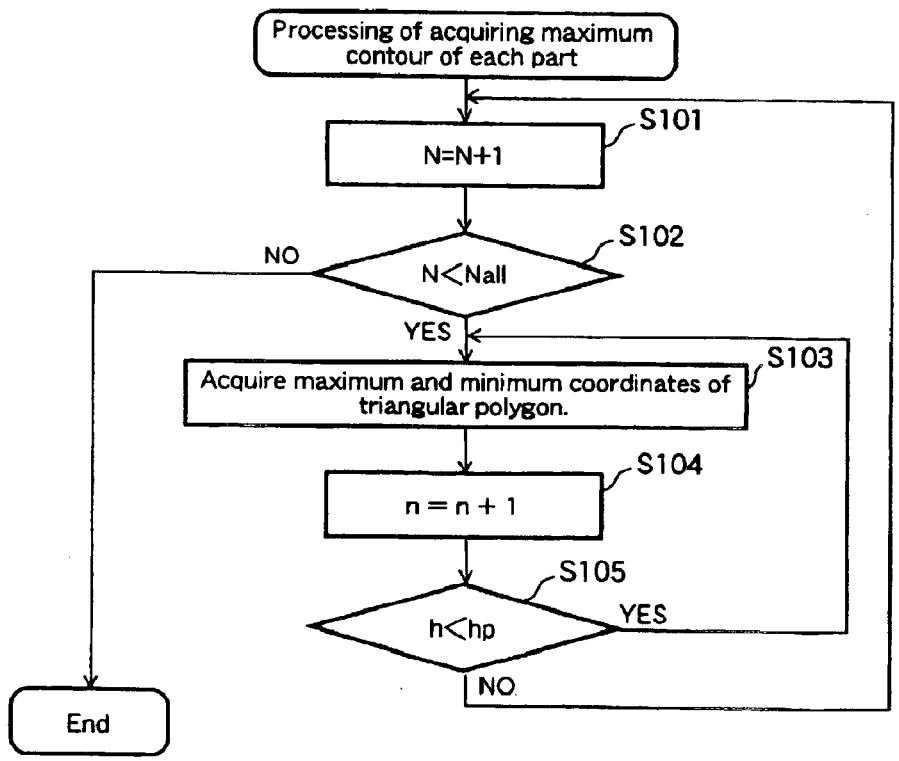
FIG. 4 is a flow chart showing in detail a maximum contour acquisition processing in detail.

FIG. 4 is a flow chart showing in detail the flow of the maximum contour acquisition processing. Here, by assuming that a total number of parts constituting the analysis model is Nall and that a counter or parameter for counting those parts which have been processed is N, the maximum contours for all the parts are sequentially acquired by making this counter count up. Also, let us assume that each part before setting of its shape is constituted by triangular polygons, and a counter or parameter for counting the number of polygons having been processed is represented by n with the number of triangular polygons constituting each part being represented by np. Note that the initial values of N and n are assumed to be 0.

First of all, the counter or parameter N is started to count up (S101). If N has not yet reached the total number (Nall) of all parts (YES in step S102), the maximum and minimum coordinates of a triangular polygon which constitutes a part to be processed are acquired (S103). The coordinates should be acquired for X coordinate, Y coordinate and Z coordinate, respectively. Then, the counter or parameter n is started to count up (S104). When n has not yet reached the total number (np) of the polygons constituting the part being currently processed (YES in step S105), the maximum and minimum coordinates of the following polygon are acquired. In this manner, processing from steps S103 to S105 is carried out for all the polygons that constitute each part, and the maximum coordinate and the minimum coordinate of each part are obtained from the maximum coordinates and the minimum coordinates of all the polygons thereof. A hexahedron having these maximum coordinates and minimum coordinates at its vertices is a minimum circumscribed hexahedron of a part and is set as the shape of the part. When the setting of one part is completed, n is returned to 0.

Figure 5:
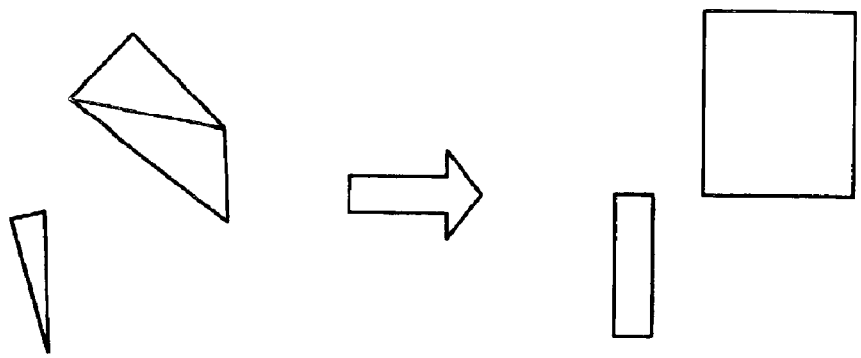
FIG. 5 is a view showing that a part constructed by triangular polygons is converted into a hexahedron.
Figure 6:
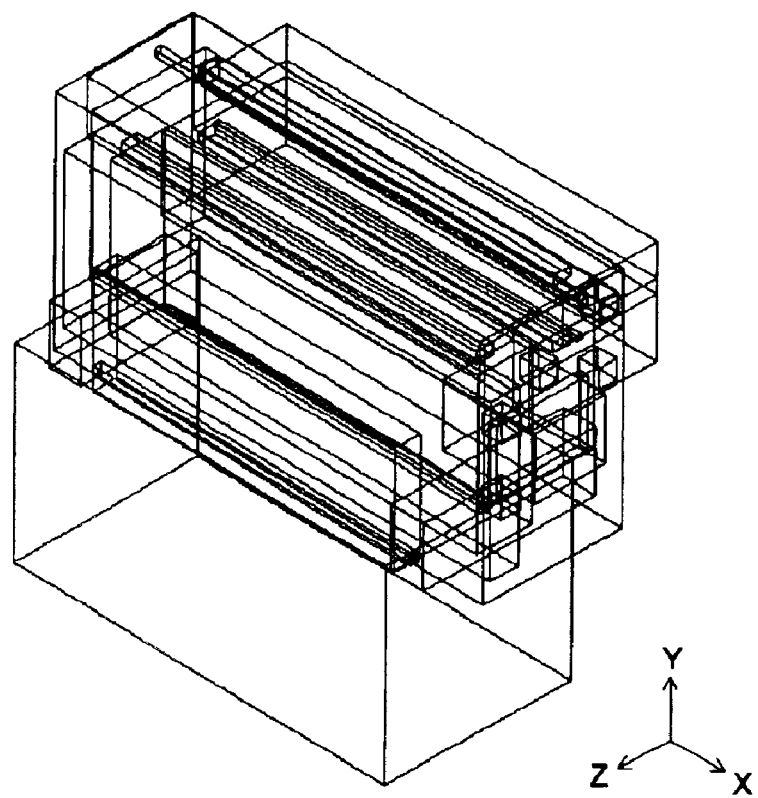
FIG. 6 is one example of an analysis model expressed by an acquired maximum contour.

The above-mentioned processing is carried out for all the parts, and at the time when N becomes Nall (NO in step S102), the shape setting processing is ended. According to the above procedure, all the parts are able to be expressed by hexahedrons, as shown in FIG. 5. In addition, one example of an analysis model expressed by maximum contours acquired in this manner is illustrated in FIG. 6.

Figure 7:
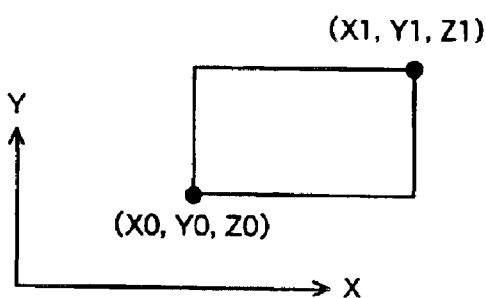
FIG. 7 shows one example of part information stored in a part information storage part.

Moreover, the part shapes, which are derived and set in the above-mentioned manner, are stored in the part information storage part 4 together with part information such as specific heat values, heat transfer coefficients, etc., acquired from the product information input device. FIG. 7 shows one example of the part information stored in the part information storage part 4. Such part information includes the above-mentioned part numbers (IDs), the part types obtained by the part shape setting part 31, the coordinates of the start point and the end point of each part contour, the specific heat and the heat transfer coefficient of each part.

A mesh of the initial stage is prepared by arranging grids at the corners of all the parts expressed by hexahedrons after the shapes of the parts have been set (step S200 in FIG. 3). This processing is carried out by the first grid preparation part 32.

Figure 8:
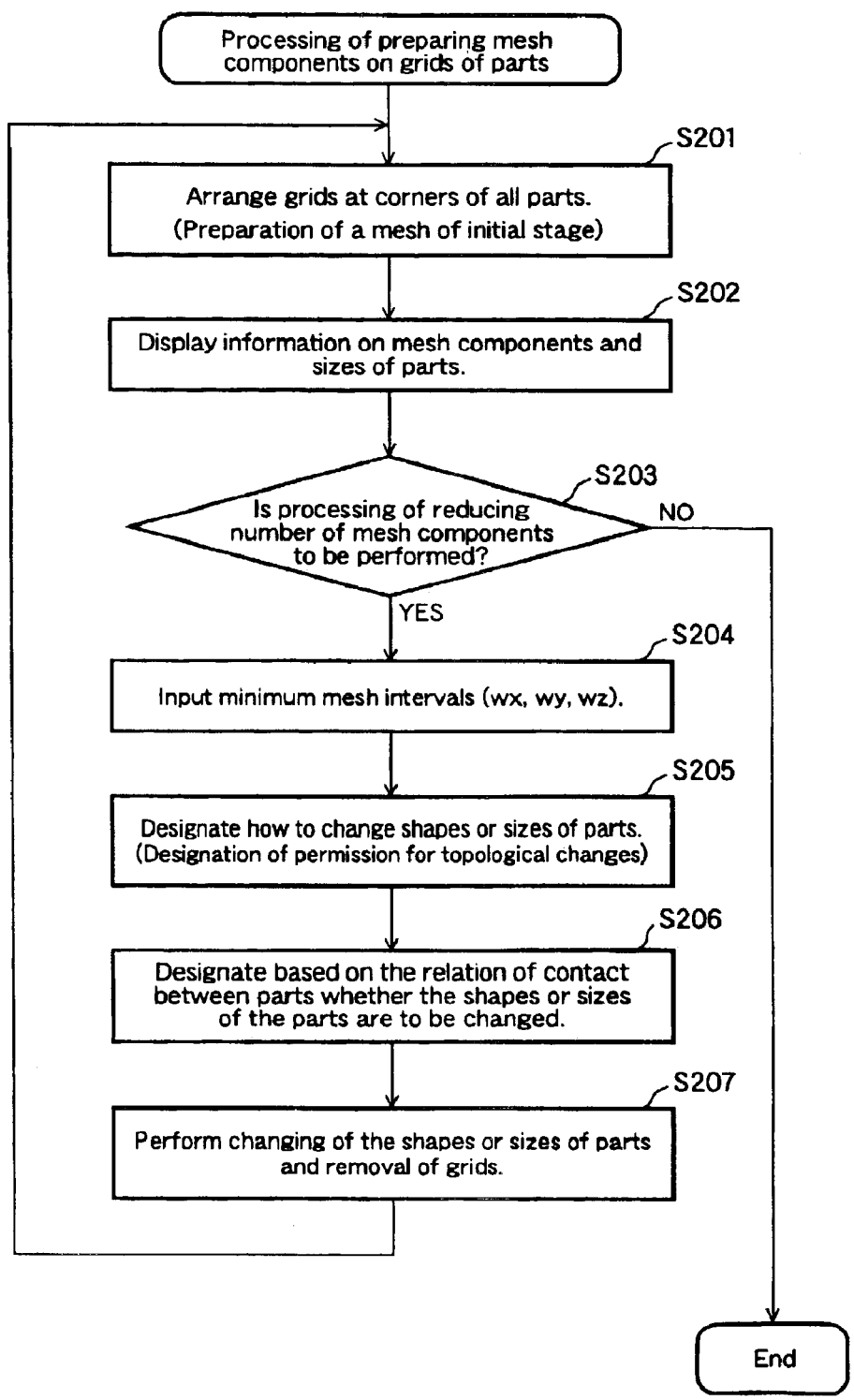
FIG. 8 is a flow chart showing in detail mesh preparation processing at the initial stage.
Figure 9:
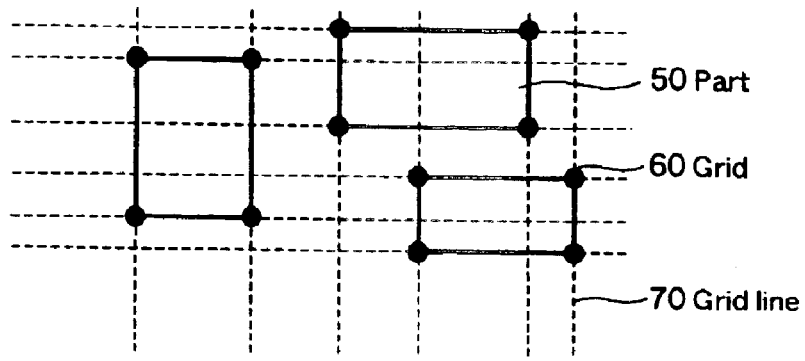
FIG. 9 is a view showing the state of parts with grids and grid lines being arranged.

FIG. 8 is a flow chart which shows in detail the flow of the mesh preparation processing of the initial stage. The processing in step S200 will be explained below by using the flow chart of FIG. 8. First of all, the first grid line setting part 35 acquires the coordinates of all the parts from the part information storage part 4, and arranges grids or nodes at all the corners of the parts (step S201). Grid lines passing through the grids are set based on the thus arranged grids to prepare a mesh of the initial stage. FIG. 9 shows the state in which grids and grid lines are arranged for parts. Parts 50 shown by the thick lines are elements building an analysis model, and grids 60 are set at all the corners of the parts 50, with grid lines 70 being arranged based on these grids 60, that is, each of the grid lines 70 passing through two vertically or horizontally arranged grids. The parts or elements 50 in FIG. 9 are shown in two dimensions, but they may be similarly illustrated in three dimensions.

When the grids are arranged in this manner, grid information at this stage is stored in the first grid information storage part 5a. Note that the grids include information on surfaces (a surface at a height of an X coordinate, a surface at a height of a Y coordinate, and a surface at a height of a Z coordinate) parallel to the y-z plane, the z-x plane and the x-y plane, and each piece of information is stored in the first grid information storage part 5a.

Figure 10:
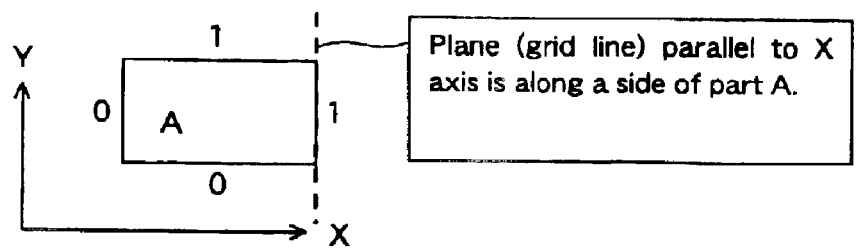
FIG. 10 is a view showing one example of grid information stored in a first grid information storage part.

FIG. 10 shows one example of such grid information stored in the first grid information storage part 5a. FIG. 10 shows information on the grids parallel to the y-z plane, the information including the grid numbers for identifying the respective grids, the part numbers and the part side numbers having their related grids for identifying the parts and part sides, respectively. Because a plurality of parts can share some grids, two or more part numbers for one grid can be stored. The part side numbers indicate where their related grids are located in their related parts, and they take the value of 0 or 1. If they take 1, they indicate the larger one of values on the X axis (grid parallel to the y-z plane) of their related parts, whereas if they take 0, they indicate the smaller one of values on the X axis of their related parts. In the example shown in FIG. 10, 1 is stored as a part side number because a surface (grid line) parallel to the X axis lies along a side 1 of a part A. Here, note that information about the z-x plane (direction of Y) and the x-y plane (direction of Z) are similarly stored. With such a data structure, coordinates can be acquired from grid information via part information.

Figure 11A:
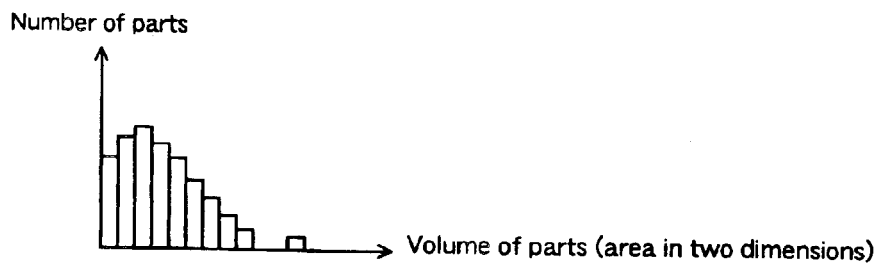
Figure 11B:
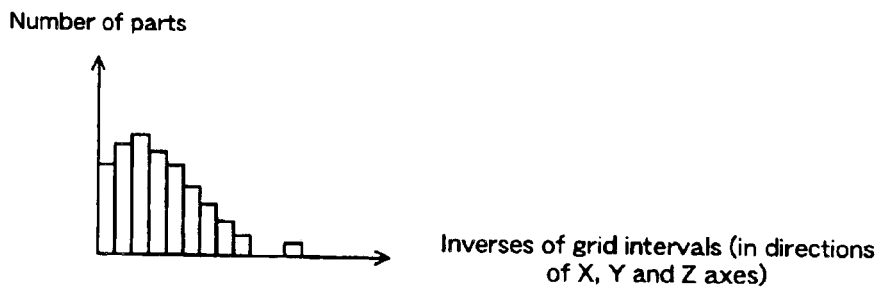

When a mesh is prepared by the grids arranged at the corners of each part in this manner, the grid line removal determining part 36 prepares a graph showing the number of those parts for each volume, and displays it on the monitor 7. In addition, the grid intervals or separations (intervals between adjacent grid lines) are calculated, and a graph showing reciprocals of the grid intervals thus obtained is prepared and displayed on the monitor 7 (step S202 in FIG. 8). FIGS. 11(a) and 11(b) are graphical representations prepared in this manner, wherein FIG. 11(a) shows a graph representing the part numbers versus the volumes of parts and FIG. 11(b) shows a graph representing the part numbers versus the reciprocals of grid intervals. Note that FIG. 11(b) is prepared in the directions of X axis, Y axis and Z axis, respectively.

An operator determines from the graphs thus displayed whether the processing of decreasing the number of mesh components (i.e., grid line removal processing) is to be carried out (step S203 in FIG. 8). For instance, if there is no mesh component having the reciprocals of grid intervals equal to or greater than a prescribed size or value in FIG. 11(b), the operator determines that the processing of decreasing the number of mesh components need not be performed, whereas if there exist mesh components each having the reciprocals of grid intervals equal to or greater than the prescribed size or value, it is determined that it is necessary to remove the grids which constitute the mesh components. The result of the determination is input to the mesh preparation apparatus 1 by means of the input operation part such as the keyboard 8, the mouse 9, etc.

It is to be noted that the "prescribed size", a criterion for determining whether the processing of decreasing the number of mesh components is to be performed, may be stored in the first grid setting condition storage part 6a beforehand, so that the grid line removal determining part 36 can automatically carry out the processing of decreasing the number of mesh components. By the addition of such a function, the flow is able to advance to the following processing easily and promptly, thereby making it possible to prevent errors in the operator's determination or judgment.

When a determination is made by the grid line removal determining part 36 that the processing of decreasing the number of mesh components is to be performed, it is then determined as to which mesh components are to be removed. Concretely, a minimum mesh interval is set so that the mesh components having their mesh intervals smaller than the minimum mesh interval are made objects or targets to be removed. In this embodiment, an input screen is displayed on the monitor 7 so that the operator can input, through the input screen, minimum mesh intervals in the directions of X axis, Y axis and Z axis, respectively. The operator inputs minimum mesh intervals (wx, wy, wz) from the keyboard 8, etc., according to the guidance of the input screen displayed on the monitor 7 (step S204).

The grid line removal determining part 36 sets, as objects or targets for removal, the mesh components having grid intervals smaller than the input minimum mesh intervals. That is, a setting is performed such that if the grid intervals of certain grids of a mesh component in the directions of X axis, Y axis and Z axis are equal to or smaller than wx, wy and wz, respectively, the corresponding grid lines of a part constituting the mesh component are removed. Here, note that if there exists no mesh component having grid intervals equal to or smaller than the minimum mesh intervals, it is determined that there is no need for removing any grid line.

It is further preferable that the minimum mesh intervals be stored in the first grid setting condition storage part 6a beforehand, so that the grid line removal determining part 36 can set the mesh components to be removed in an automatic manner. By the addition of such a function, it is possible to carry out the processing in an easy and prompt manner.

Figure 12A:
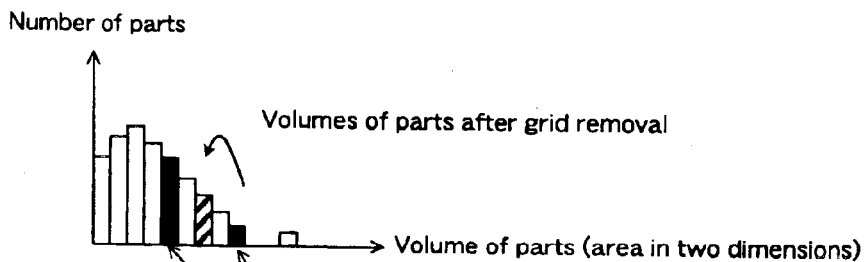
Figure 12B:
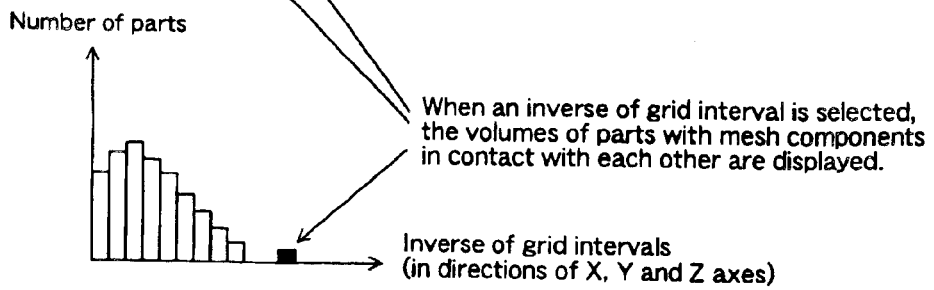

In addition, it may be constructed such that when the operator selects one of the bars for the reciprocals of grid intervals in the graph displayed on the monitor 7 by means of the mouse 9, etc., before grid removal, as shown in FIG. 12(b), it is possible to display in a graph the volumes of the parts (i.e., black bars in FIG. 12(a)) whose mesh components constituting the selected bar are in contact with each other, as shown in FIG. 12(a). Thus, the operator can grasp the situation of the mesh components and the grids in detail by displaying such graphical representations. Moreover, it may be constructed such that if the grid line removal determining part 36 automatically selects the bars equal to or smaller than wx, wy, and wz in the graph FIG. 11(b) so as to display the volumes of corresponding parts in the graph FIG. 11(a), instead of carrying out such a display by means of the manual operation of the operator, at the instant when the above-mentioned minimum mesh intervals are input, it will be possible to promptly display the situation without troubling the operator.

When the mesh components to be removed are set, the processing of removing the grids of these mesh components is started. This grid removal processing is carried out by the cooperation of the part change determining part 37, the part changing part 38 and the first grid line setting part 35.

First of all, the operator designates or specifies the condition for grid removal (step S205 in FIG. 8). An input screen for specifying or designating this condition is provided by the part changing part 38, and it is displayed on the monitor 7. Here, the operator performs the designation of how to change the shape and/or size of each part, and at the same time the designation of permission for a topological change of each part.

For instance, it is possible to make these designations as follows. "Designation of the sizes of the parts to be changed: only those parts which have their sizes equal to or smaller than (dx, dy, dz) are permitted to be subjected to geometrical and topological changes". Here, (dx, dy, dz) represent the sizes in the directions of X, Y and X, respectively, of parts modified into hexahedral shapes. The input condition is stored in the first grid setting condition storage part 6a. When such designations are made, the removal of the grid lines is not carried out for the parts of the sizes equal to or greater than prescribed sizes (dx, dy, dz) even if intervals or separations between the adjacent parts are narrow (i.e., even for the mesh components for which the removal of grid lines is set by the grid line removal determining part 36). That is, the grid lines on the parts smaller than the prescribed sizes become the objects or targets to be removed.

The topological changes of three dimensional parts include the following cases. (1) Hexahedron→Hexahedron, (2) Hexahedron→Plane, and (3) Hexahedron→Null (Line or Point). Also, the topological changes of two dimensional parts include the following cases. (1) Plane→Plane, (2) Plane→line, and (3) Plane→Null (Point). Because points (also including lines in three dimensions) are equivalent to nonexistence of anything for fluid in a flow analysis according to the finite volume method, the designations concerning topological changes become a material factor in the grid line removal processing.

Subsequently, the operator designates or specifies a more detailed condition in addition to the above-mentioned designations of the geometrical and topological changes. An input screen for designating or specifying this condition is provided by the part changing part 38, and it is displayed on the monitor 7, though not shown. FIG. 13 is a table which illustrates one example of such a condition designation. In this example, an item of "Geometrical change" is designated as changeable in shape or size. However, an item of "Topological change" is designated as changeable from a hexahedron to a plane, but as unchangeable from a hexahedron to a line or point.

Moreover, in a thermal or fluid numerical analysis, heat conduction according to the contact of parts greatly influences analytical results. Accordingly, when parts are in contact with each other and mutually intersect each other, it is sometimes better not to make the grid lines for these parts objects or targets to be removal. In this embodiment, when it is thought that the removal of grid lines for parts exerts a great influence on analytical results based on the state of arrangements of the parts, these grid lines are not removed. On the other hand, when it is thought that such removal does not exert a great influence on analytical results, the grid lines may be removed, and hence the designation of such removal can be performed (S206 in FIG. 8).

Here, note that an input screen for such a designation is provided by the part changing part 38 and it is displayed on the monitor 7, though not shown. FIG. 14 is a table which illustrates one example of such a designation. In this example, the grid lines on those parts which contact with each other or intersect each other are excluded from the objects or targets to be removed (i.e., targets to be changed in the shapes or sizes of parts). The input conditions are stored in the first grid setting condition storage part 6a.

FIG. 15 through FIG. 17 show the contact relations between part A and another part B. Part A includes the grids which are determined to be removed by the grid line removal determining part 36. FIG. 15 shows the arrangement type in which part A is in contact with part B. Although it is generally not so frequent that the existence of part A exerts a great influence on analytical results, part A might sometimes act to conduct or dissipate the heat of part B. In this case, the heat conduction of part B might greatly be affected.

FIG. 16 shows the arrangement type in which part A intersects part B. In this type, too, part A might also act to conduct or dissipate the heat of part B. In addition, when part A plays an important role in the heat flow as in the case where heat or the like is transmitted to part B primarily through part A, part A might greatly affect the heat conduction inside part B.

FIG. 17 shows the arrangement type in which part A exists within part B. In this type, too, part A might also affect the heat conduction inside part B.

Thus, the removal of grids for those parts which are in contact or mutually intersect with each other might greatly affect heat conduction. Accordingly, even if the grids of such parts as mutually contacting or intersecting with each other are made objects or targets to be removed by the grid line removal determining part 36, it is better to exclude them from the above-mentioned targets to be removed.

Here, note that the operator is required to input the designation of changes in the sizes of parts and the designation of the targets to be removed according to the contact relations between parts as mentioned above immediately before the removal processing. However, in another embodiment, it is further preferred that these designations be stored in the first grid setting condition storage part 6a beforehand. By the addition of such a function, it becomes possible to carry out the processing in an easy and prompt manner, thereby reducing the operator's load.

Figure 18:
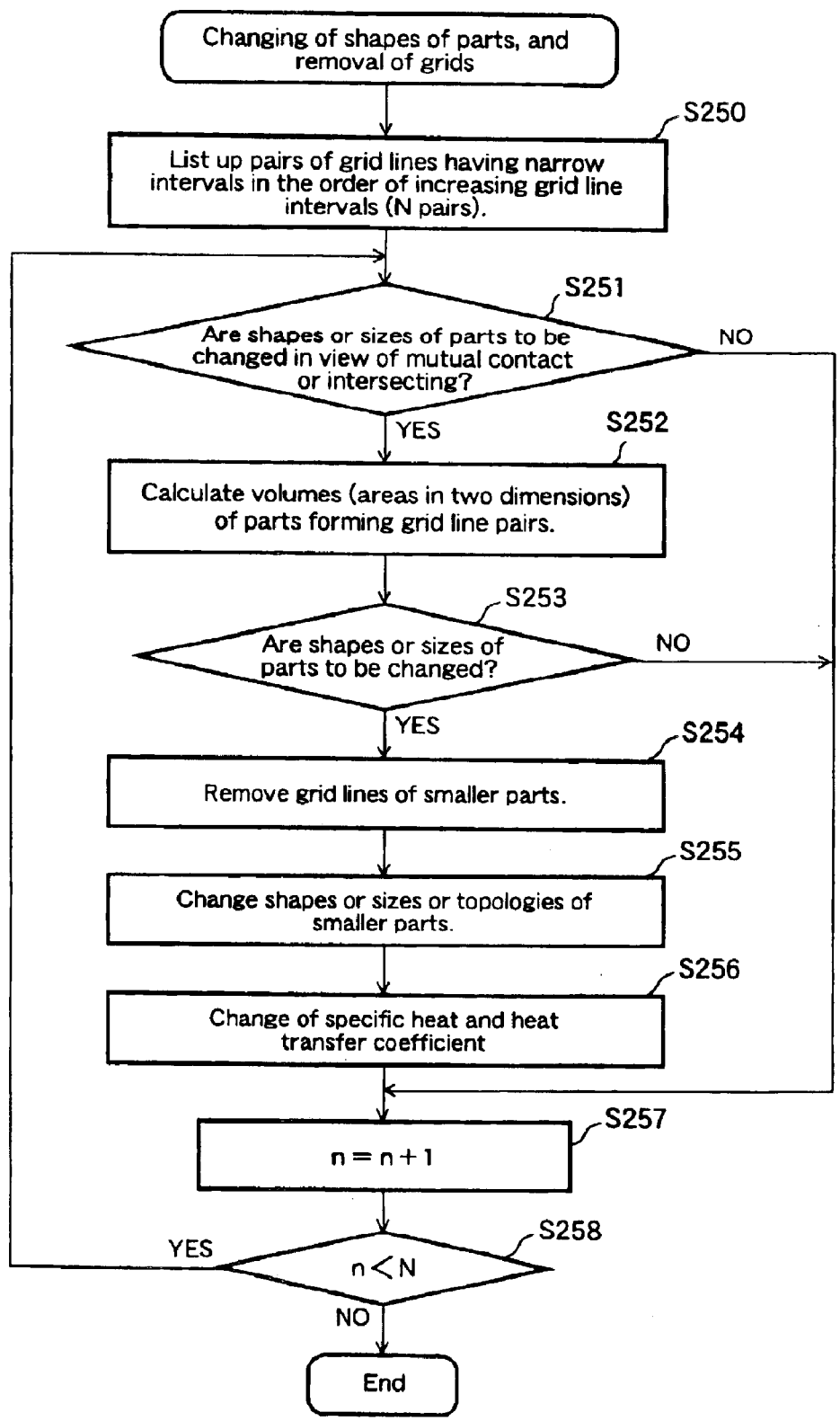
FIG. 18 is a flow chart showing details of grid removal processing.

After various designations for grid removal are input and stored in this manner, the grid removal processing is actually carried out (S207 in FIG. 8). FIG. 18 is a flow chart which shows the details of the grid removal processing. First of all, the part change determining part 37 lists up a preset number (i.e., this number being generally designated in advance, and in this case designated as N) of pairs of grid lines, which constitute the mesh components to be removed and which are set to be removed, in the order of increasing grid line intervals (step S250).

Then, the part change determining part 37 successively verifies, based on the settings stored in the first grid setting condition storage part 6a, whether each of the N pairs of grid lines belongs to any of the contact and/or intersection arrangement types as shown from FIG. 15 to FIG. 17, and makes a determination as to whether the shape and/or size of each part is to be changed (step S251). When the parts to be removed belong to any of the cases from FIG. 15 to FIG. 17 (NO in step S251), it is determined that the pairs of grid lines for these parts are not removed, as referred to above.

When they do not belong to the cases from FIG. 15 to FIG. 17 (YES in step S251), the part change determining part 37 calculates the volume of each part (area in case of a two dimensional part) which constitute the grid line pairs (step S252). It is determined that the grid removal processing is not carried out for those parts of which the calculated volumes are each equal to or greater than a prescribed value input by the part changing part 38 even if the grid line intervals are narrow (NO in step S253). On the contrary, it is determined that the grid removal processing is carried out for those parts of which the calculated volumes are smaller than the values (dx, dy, dz) input by the part changing part 38 (YES in step S253).

When the grid line pairs become the targets for removal as the result of the permission or non-permission determination about the grid line removal processing made by the part change determining part 37, the first grid line setting part 35 compares the sizes of the parts constituting the target grid lines with each other, and removes the grid lines which are constituted by the smaller ones of the parts (step S254). Along with the grid line removal, the part changing part 38 changes the shapes, sizes and/or topologies of the smaller parts based on the condition as shown in FIG. 13 (step S255).

Figure 19A:
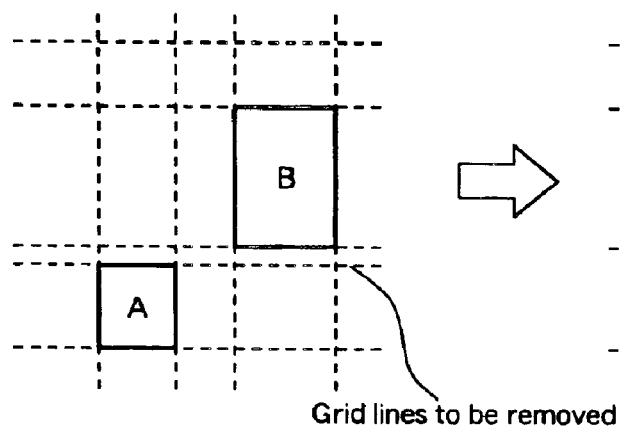
FIGS. 19(a) and 19(b) are views visually showing one example of a part size changing processing, in which the sizes of parts are expanded.
Figure 19B:
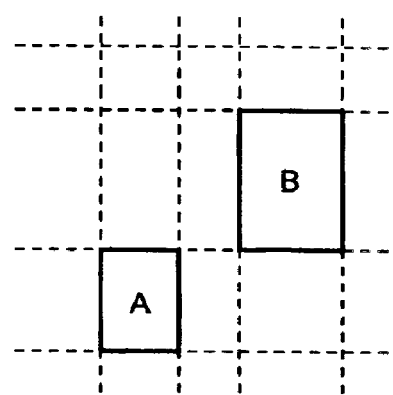

FIGS. 19(a) and 19(b) visually show one example of such part shape and/or size changing processing, in which the sizes of parts are expanded. FIG. 19(a) shows the state of parts before the sizes of the parts are changed. When the grid lines of part A are removed, the part changing part 38 expands part A in such a manner that one grid line of part A is superposed on one grid line of part B. The state of part A expanded in this manner is illustrated in FIG. 19(b).

Figure 20A:
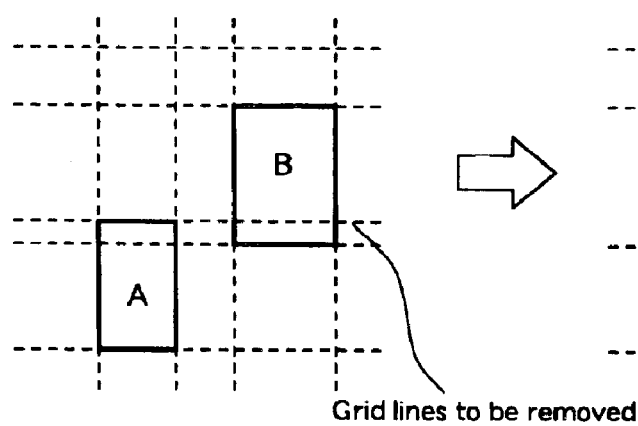
FIGS. 20(a) and 20(b) are views visually showing another example of a part size changing processing, in which the sizes of parts are reduced.
Figure 20B:
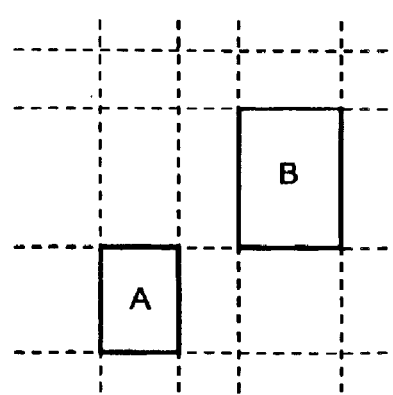

FIGS. 20(a) and 20(b) visually show one example of the part shape and/or size changing processing, similarly to FIGS. 19(a) and 19(b), however these figures illustrate the case where the sizes of parts are reduced. FIG. 20(a) illustrates the state of parts before the sizes of the parts are changed. When the grid lines of part A are removed, the part changing part 38 reduces part A in such a manner that one grid line of part A is superposed on one grid line of part B. The state of part A reduced in this manner is illustrated in FIG. 20(b).

Figure 21A:
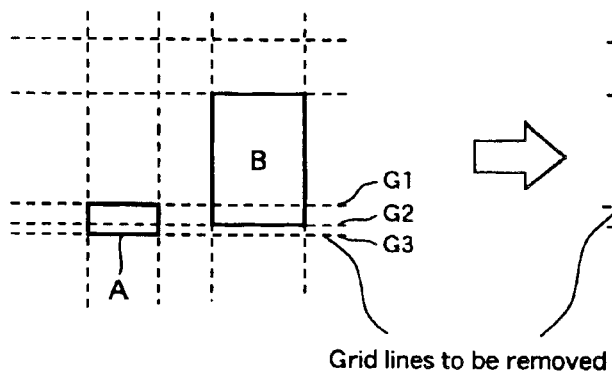
FIGS. 21(a) through 21(c) are views visually showing one example of topology changing processing for parts.
Figure 21B:
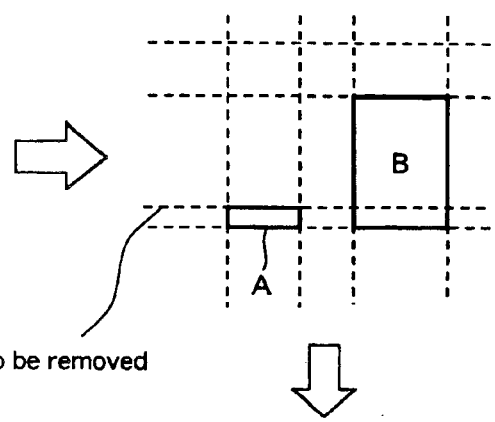
Figure 21C:
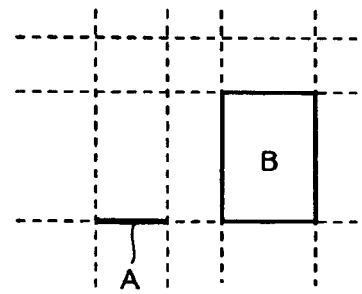

FIGS. 21(a) and 21(b) visually show one example of the part topology changing processing. First of all, FIG. 21(a) illustrates the state of parts before the shapes or the like of the parts are changed. A pair of grid lines G1 and G3 are arranged according to part A. A grid line G2 is arranged according to part B. Here, the grid line G3 on the part A side among the grid line pair G2 and G3 having the narrowest grind line interval is first removed. The size of part A is reduced by this grid line removal (FIG. 21(b)). Then, if a pair of grid lines G1 and G2 are also objects or targets to be removed, the grid line G1 is removed. Thus, the topology of part A is changed from a hexahedron into a plane (or from a plane into a line in case of two dimensions) (FIG. 21(c)). Note that because the topological change from a hexahedron to a line or point is not permitted in the example of the settings in FIG. 13, the grid line G1 is not removed.

When the grid lines are removed in this manner, the data for these grid lines stored in the first grid information storage part 5a is removed by the first grid line setting part 35, and the number of parts sharing grids is increased by the change in the sizes of parts. Thus, changes are made to the items of the corresponding part numbers in the grid information.

Here, note that the thermal capacity of a part changes as the shape and/or size thereof are changed. Accordingly, the accuracy in the analytical results obtained in the thermal or fluid analysis is worsened. For this reason, according to this embodiment, in order to prevent a change in the thermal capacity of each part, the specific heat and heat transfer coefficient changing part 33 performs the processing of changing the specific heat of each part in the following manner (step S256 in FIG. 18).

the volume of the original part: $V_0$, the volume of the changed part: $V$ the specific heat of the original part: $c_0$, the specific heat of the changed part: $c$ the transformation equation of specific heat: $c=c_0 \times V_0/V$ The specific heat changed in this manner is stored in the part information storage part 4.

In addition, when the shape and/or size of a part are changed, the surface area of the part is varied, thereby changing the amount of heat transmission of the part. As a result, the accuracy in the analytical results obtained in the thermal or fluid analysis is worsened. Thus, according to this embodiment, in order to prevent a change in the amount of heat transmission of each part, the specific heat and heat transfer coefficient changing part 33 performs the processing of changing the heat transfer coefficient of each part in the following manner (step S256 in FIG. 18).

the surface area of the original part: $S_0$, the surface area of the changed part: $S$ the heat transfer coefficient of the original part: $w_0$, the heat transfer coefficient of the changed part: $w$ the transformation equation of heat transfer coefficient: $w=w_0 \times S_0/S$ The heat transfer coefficient changed in this manner is stored in the part information storage part 4.

After one grid line pair has been subjected to the above-mentioned processing, the counter or parameter n for counting the number of grid line pairs processed is made to count up (step S257). If n is smaller than N (YES in step S258), the following grid line pair are verified and the grid line removal processing is performed. In this manner, grid line pairs up to N are sequentially verified. When n reaches N, the grid line removal processing has been completed for all the grid line pairs (NO in step S258).

Figure 22:
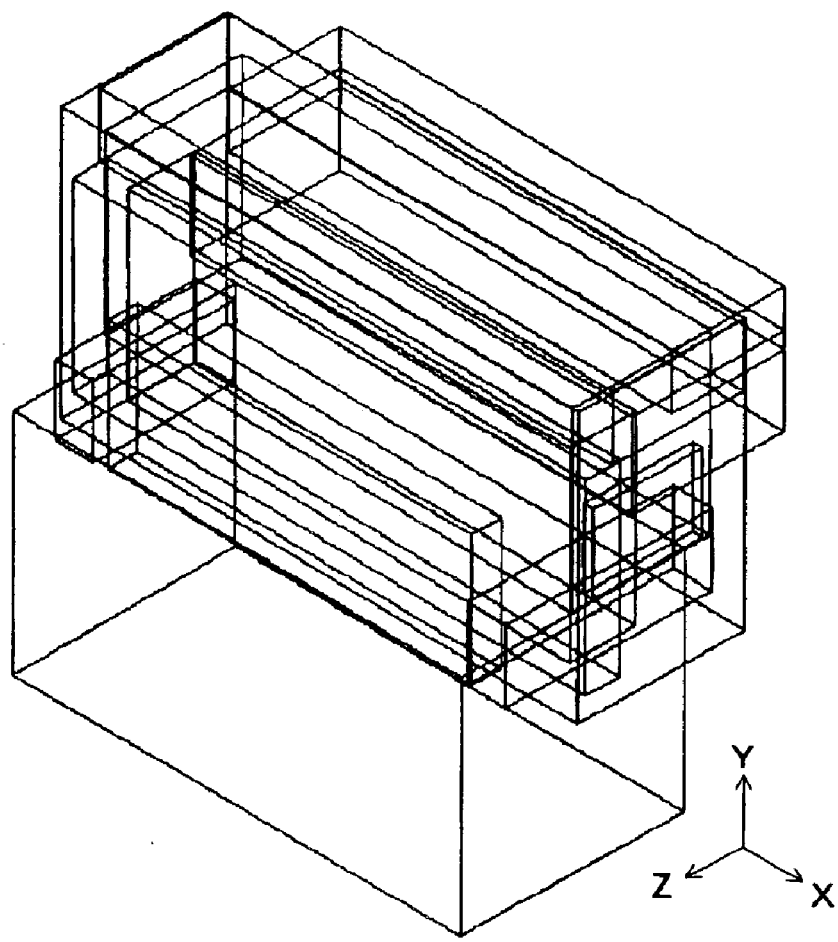
FIG. 22 shows one example of an analysis model obtained by grid removal processing.

By removing the grid lines in this manner, the shapes and/or sizes of the parts are accordingly changed to reduce the total number of mesh components. FIG. 22 shows one example of an analysis model obtained by the grid removal processing as described above with reference to the analysis model of FIG. 6. By obtaining such an analysis model, the time required for the analysis is shortened, thus making it possible to provide analytical results with higher accuracy.

According to this embodiment, the analysis model thus obtained is further subjected to the processing of adding intermediate grids. Concretely, the numbers ($N_x$, $N_y$, $N_z$) of intermediate grids to be added in the directions of X, Y and Z, respectively, are designated or specified. The intermediate grids are added in such a manner that the number of intermediate grids to be added does not exceed that as designated above, and the grid intervals already prepared can be divided substantially equally (step S300 in FIG. 3). This processing is performed by the second grid preparation part 34.

Figure 23:
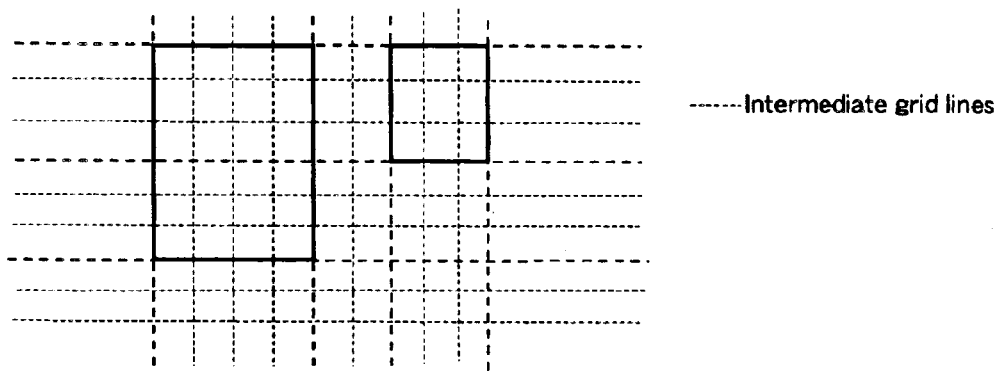
FIG. 23 is a view showing the state of a mesh when intermediate grids are added.

FIG. 23 shows the state of a mesh when intermediate grids are added. As shown in this figure, the intermediate grid lines (thin dotted lines) are arranged at equal intervals between the grid lines of the initial stage (thick dotted lines) so each mesh component or cell may become a substantially square shape. Now, the processing of arranging intermediate grids will be explained below in detail by using the following flow chart.

Figure 24:
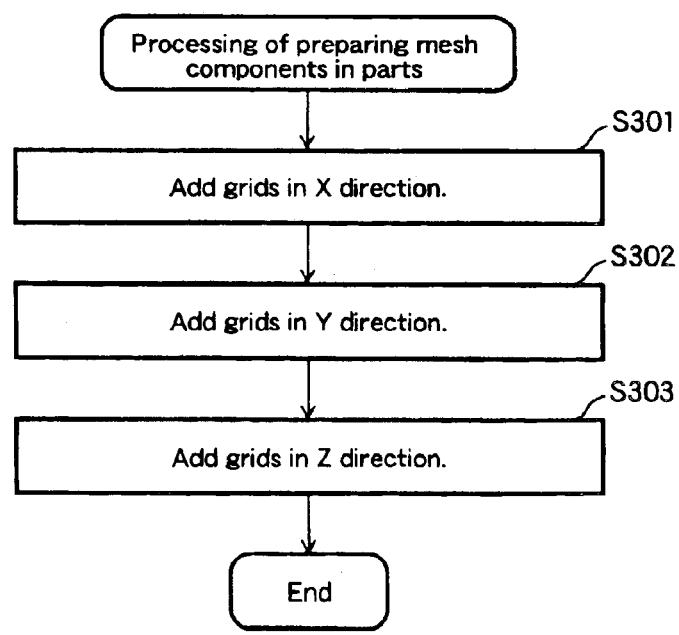
FIG. 24 is a flow chart showing the outline of the processing of adding an intermediate grid.
Figure 25:
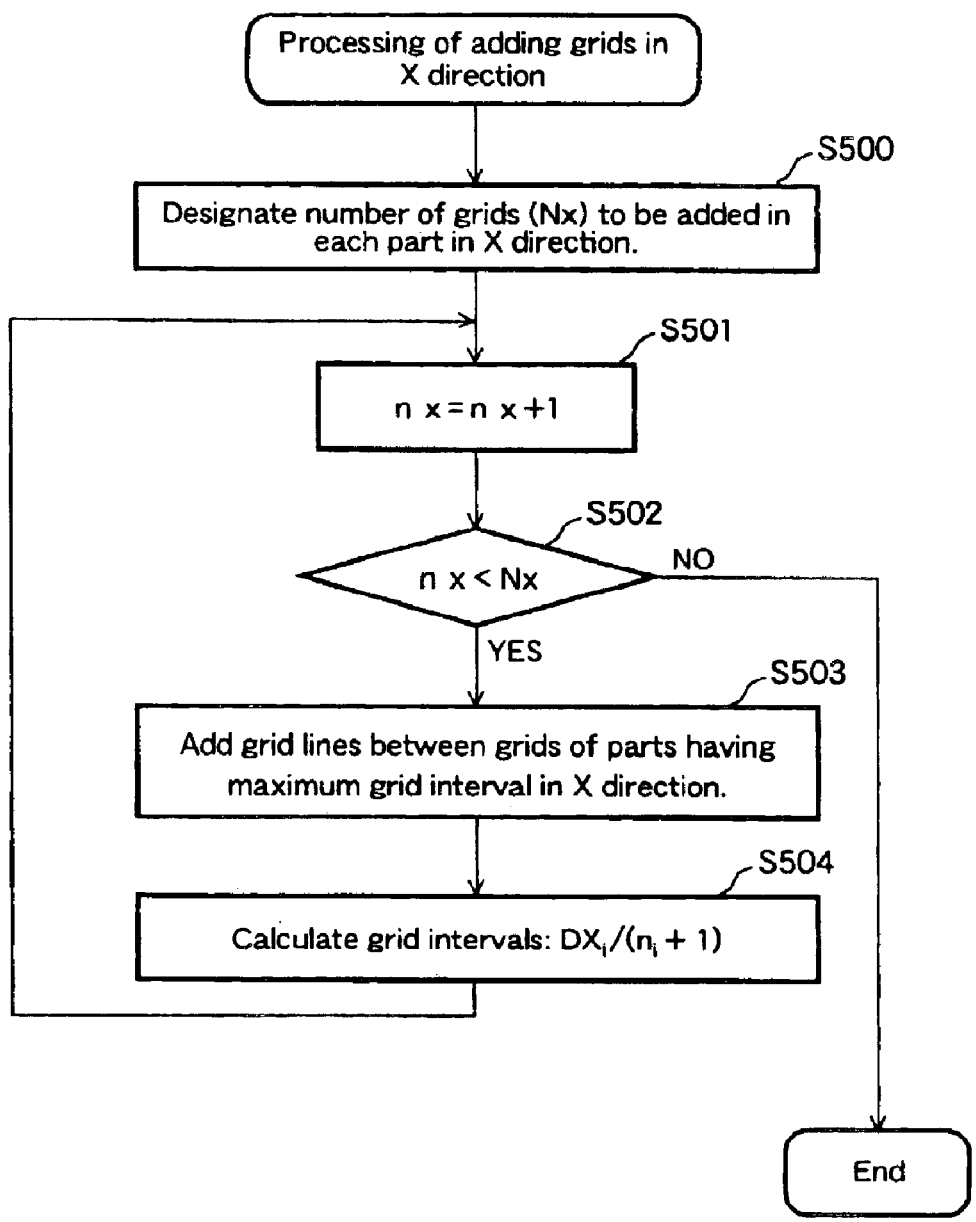
FIG. 25 is a flow chart showing details of the processing of adding intermediate grids in the direction of X.

FIG. 24 is a flow chart which shows the outline of the processing of adding intermediate grids. According to this embodiment, as shown in FIG. 24, intermediate grids are added on the whole by sequentially performing the addition of intermediate grids in the direction of X (step S303), the addition of intermediate grids in the direction of Y (step S302), and the addition of intermediate grids in the direction of Z (step S301), respectively.

FIG. 24 is a flow chart which shows the details of the processing of adding intermediate grids in the direction of X. First of all, the number of grids ($N_x$) to be added in each part in the direction of X is designated or specified. The operator may input this designation on the input screen (not shown) provided by the second grid line setting part 39. In addition, the number of additional grids may be stored in the second grid setting condition storage part 6b beforehand (step S500).

Then, the counter or parameter nx for counting the number of grids added is made to count up by means of the second grid line setting part 39 (step S501). If nx is smaller than Nx (YES in step S502), grid lines are added between the grids of a part having the greatest space width (maximum grid interval) in the direction of X (step S503). Subsequently, the grid interval which is changed by the addition of the intermediate grids is calculated (step S504). Concretely, the grid interval calculation part 40 calculates the new or changed grid interval from ni, which is the number of the grid lines added in the space (i-th space or interval) between adjacent parts, and DXi, which is the interval (i-th interval) between the parts. One example of an equation for calculating the grid interval is shown below.

Grid interval=$DXi/(ni+1)$

The above-mentioned processing is repeated until nx reaches the number of additional grids designated. When nx reaches Nx (NO in step S502), the processing of adding grids in the direction of X is ended.

Figure 26:
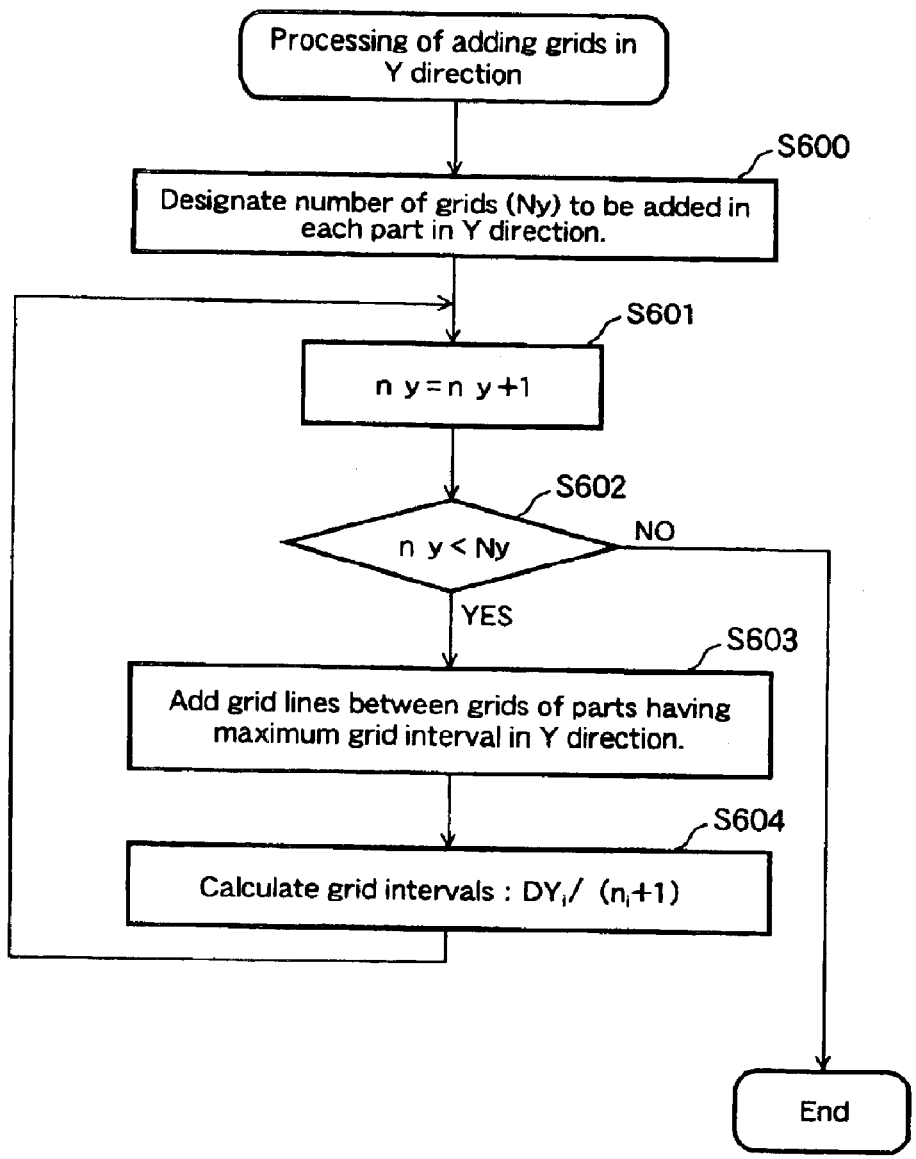
FIG. 26 is a flow chart showing details of the processing of adding grids in the direction of Y.

Next, the processing of adding grids in the direction of Y will be explained. FIG. 26 is a flow chart which shows in detail the flow of the processing of adding grids in the direction of Y. In this case, too, the number of grids (Ny) to be added in each part in the direction of Y is first designated or specified, as in the processing of adding grids in the direction of X (step S600). Then, the counter or parameter ny for counting the number of added grids is made to count up by means of the second grid line setting part 39 (step S601). If ny is smaller than Ny (YES in step S602), grid lines are added between the grids of a part having the greatest space width (maximum grid interval) in the direction of Y (step S603). Subsequently, the grid interval calculation part 40 calculates the new or changed grid interval from ni, which is the number of the grid lines added in the space (i-th space or interval) between adjacent parts, and DYi, which is the interval (i-th interval) between the parts (step S604). An equation for calculating the grid interval in the direction of Y is also similar to that for calculating the grid interval in the direction of X. That is, Grid interval=$DYi/(ni+1)$ The above-mentioned processing is repeated until the designated number of additional grids is reached.

Figure 27:
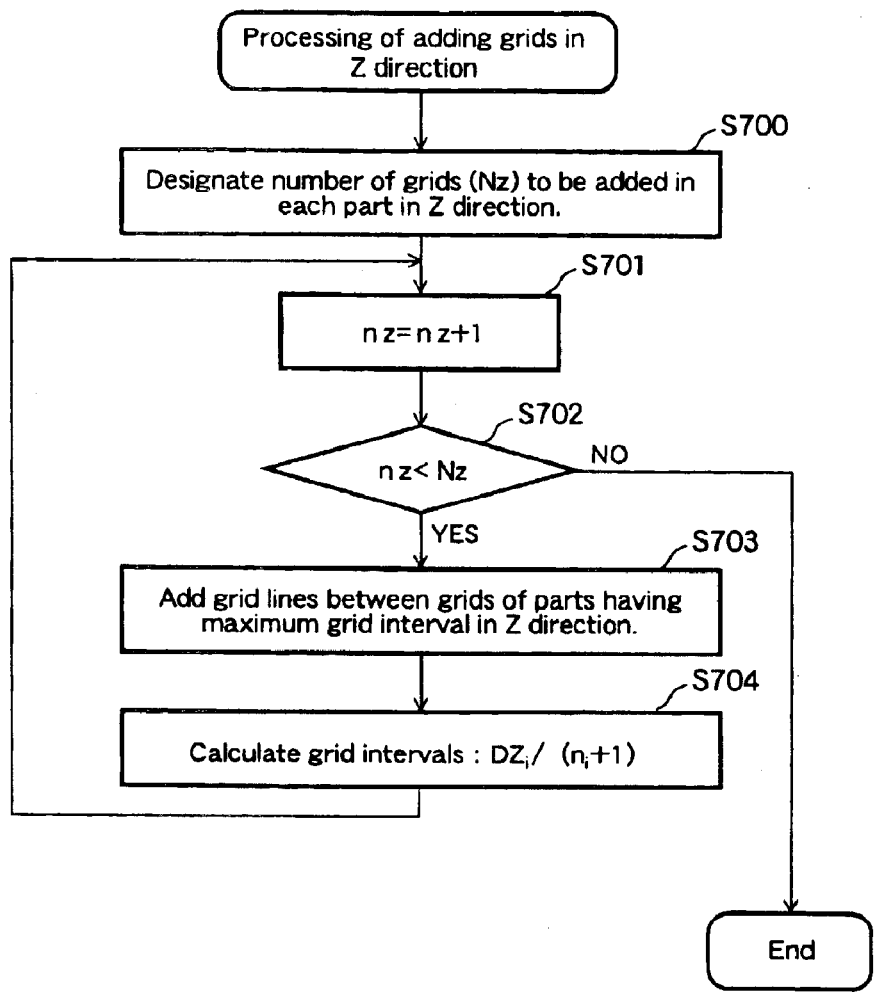
FIG. 27 is a flow chart showing details of the processing of adding grids in the direction of Z.

Further, the processing of adding grids in the direction of Z will be explained. FIG. 27 is a flow chart which shows in detail the flow of the processing of adding grids in the direction of Z. In this case, too, the number of grids (Nz) to be added in each part in the direction of Z is designated or specified, as in the processing of adding grids in the direction of X (step S700). Then, the counter or parameter nz for counting the number of added grids is made to count up by means of the second grid line setting part 39 (step S701). If nz is smaller than Nz, grid lines are added between the grids of a part having the greatest space width (maximum grid interval) in the direction of Z (step S703). Subsequently, the grid interval calculation part 40 calculates the new or changed grid interval from ni, which is the number of the grid lines added in the space (i-th space or interval) between adjacent parts, and DZi, which is the interval (i-th interval) between the parts (step S704). An equation for calculating the grid interval in the direction of Z is also similar to that for calculating the grid interval in the direction of X. That is, Grid interval=$DZi/(ni+1)$ The above-mentioned processing is repeated until the designated number of additional grids is reached.

Information on the grids added in this manner is stored in the memory (the second grid information storage part 5b).

The information stored in the part information storage part 4, the first grid information storage part 5a and the second grid information storage part 5b, i.e., the information on the prepared mesh, is output to and used by an external unit as analytical data.

Embodiment 2

In the above-mentioned first embodiment, some grids are removed by changing the shapes and/or sizes of parts, but a second embodiment of the present invention discloses a mesh preparation apparatus in which grids are removed to reduce the number of mesh components by changing the arrangements of parts.

Figure 28:
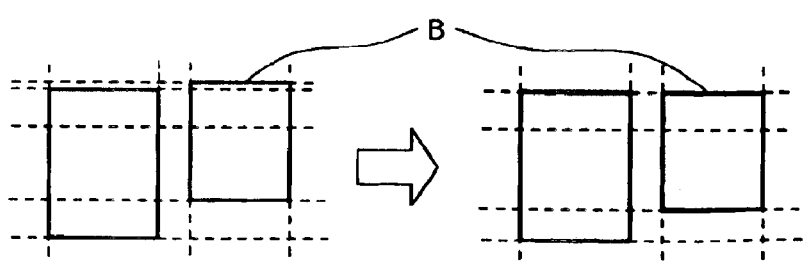
FIG. 28 is a view showing the processing of removing a grid line through a parallel displacement of part B according to a second embodiment of the present invention.

Block diagrams showing the overall configuration of the mesh preparation apparatus according to this second embodiment are similar to FIG. 1 and FIG. 2 shown in the first embodiment, and the flow of processing in this second embodiment is also similar to that of the first embodiment. However, the second embodiment is different from the first embodiment in that the part changing part 38 changes the arrangements of parts instead of changing the shapes and/or sizes thereof. In this case, a grid line passing a side of part B is removed by performing a parallel displacement of the part B in the downward direction, as shown in FIG. 28.

The set condition stored in the first grid setting condition storage part 6a at this time can be designated or specified for instance as follows. "Designation of the sizes of parts to be changed: the arrangements of only those parts of which the sizes are equal to or smaller than (dx, dy, dz) can be changed.

In addition, in this second embodiment, the sizes of parts are not changed, and hence the designation of topological changes is not made either.

When the arrangements of parts are changed, the part information stored in the part information storage part 4 is also changed accordingly. Moreover, neither the specific heats nor the heat transfer coefficients of parts are changed in this second embodiment because the shapes and/or sizes of parts are not changed.

Embodiment 3

Figure 29:
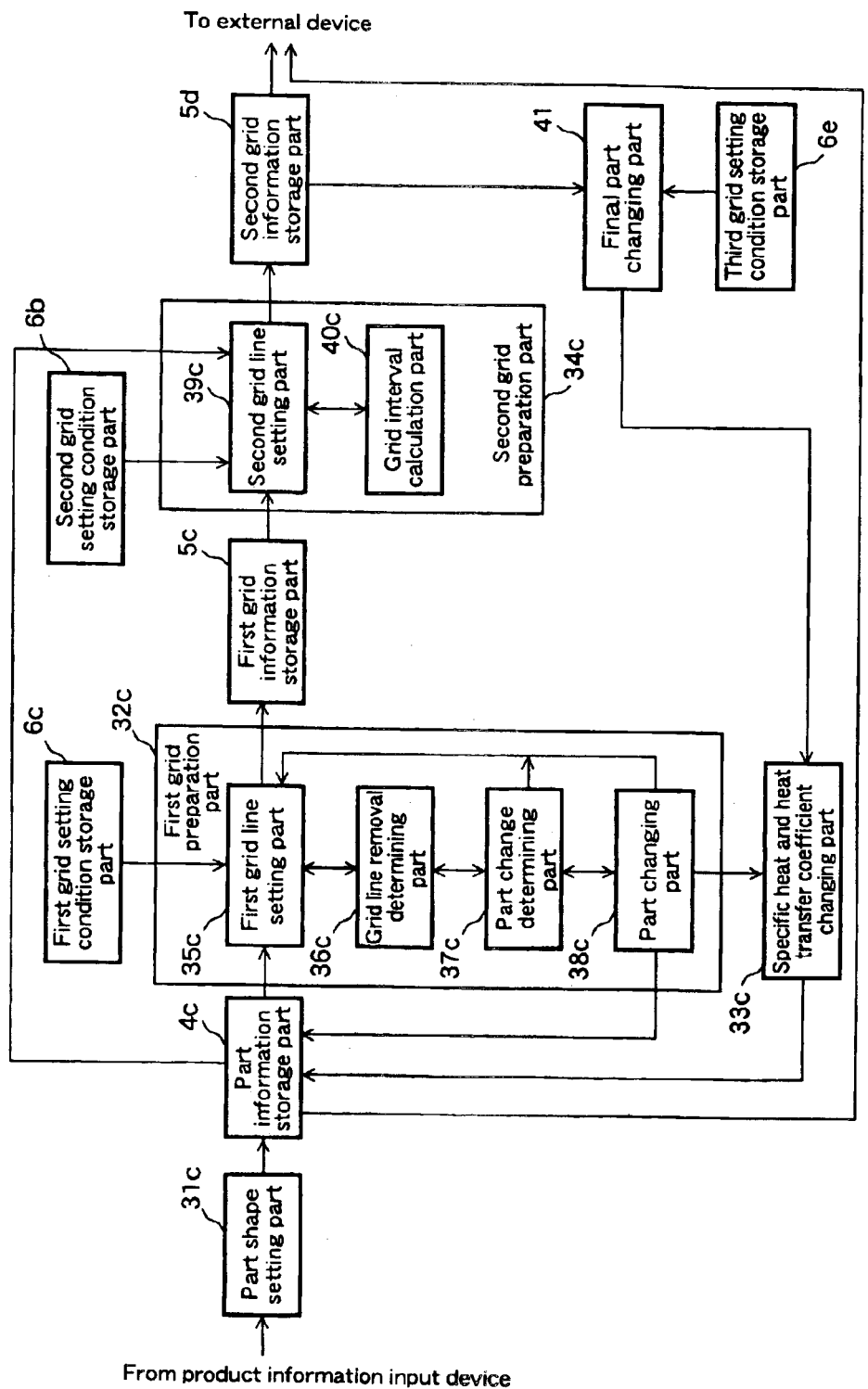
FIG. 29 is a block diagram showing in detail the configuration of a computer employed in a mesh preparation apparatus according to a third embodiment of the present invention.

A third embodiment of the present invention discloses a mesh preparation apparatus which prepares a mesh by combining a scheme of changing the shapes and/or sizes of parts as described in the first embodiment, and another scheme of changing the arrangements of parts as described in the second embodiment. Here, note that a block diagram showing the overall configuration of the mesh preparation apparatus of this third embodiment is similar to FIG. 1 shown in the first embodiment. A detailed block diagram of the computer 2 according to this third embodiment is shown in FIG. 29. As illustrated in this figure, the mesh preparation apparatus according to the third embodiment includes, in addition to the configuration of FIG. 2, a final part changing part 41 which performs the processing of performing parallel displacements of parts as well as the processing of changing the shapes and/or sizes of parts after the preparation of intermediate grids, and a third grid setting condition storage part 6e which stores grid setting conditions or the like referred to by the final part changing part 41.

Figure 30:
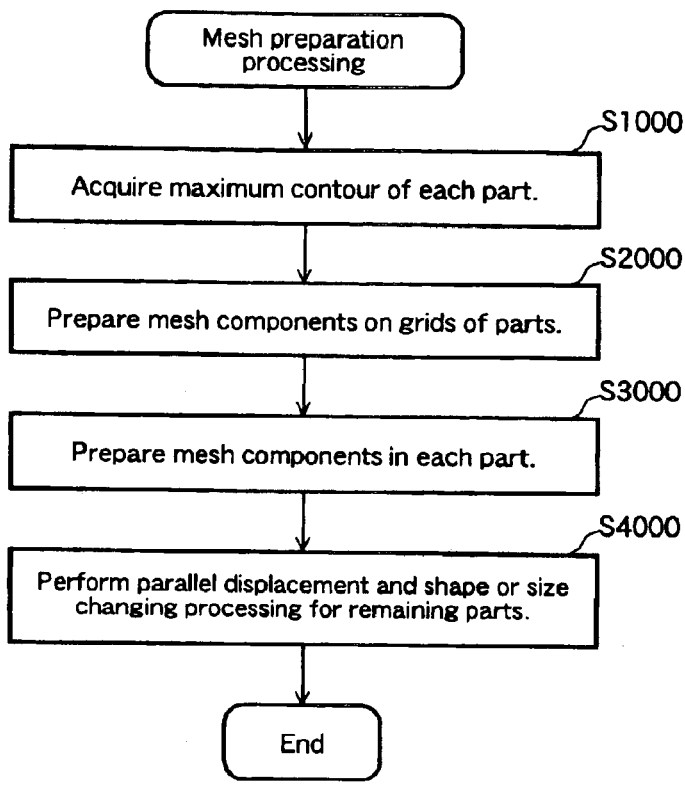
FIG. 30 is a flow chart showing a mesh preparing operation in the third embodiment.

FIG. 30 is a flow chart which shows the flow of a mesh preparing operation according to the third embodiment. First of all, the processing of converting all the parts constituting an analysis model into hexahedrons is carried out as an initial stage (step S1000). Since this processing is similar to that in the first embodiment, an explanation thereof is omitted. Then, a mesh of the initial stage is prepared by arranging grids at the corners of a predetermined number of those parts which are selected from among the parts expressed in the form of hexahedrons in the order of decreasing sizes (step S2000). This processing is carried out by a first grid preparation part 32c.

The flow of the processing in step S2000 is the same as that shown in the flow chart of FIG. 8, and hence a detailed explanation thereof is omitted. At this stage, mesh components are prepared and decreased by changing the shapes and/or sizes of the parts as in the first embodiment. Then, the processing of arranging intermediate grids (i.e., processing of creating mesh components in each part) is carried out (step S3000). This processing is also similar to the intermediate grid preparation processing in the first embodiment, and hence an explanation thereof is omitted. However, note that those parts for which the arrangement of grids is not performed in step S2000 are excluded from the objects for which intermediate grids are to be prepared. This processing is performed by a second grid preparation part 34c.

Figure 31:
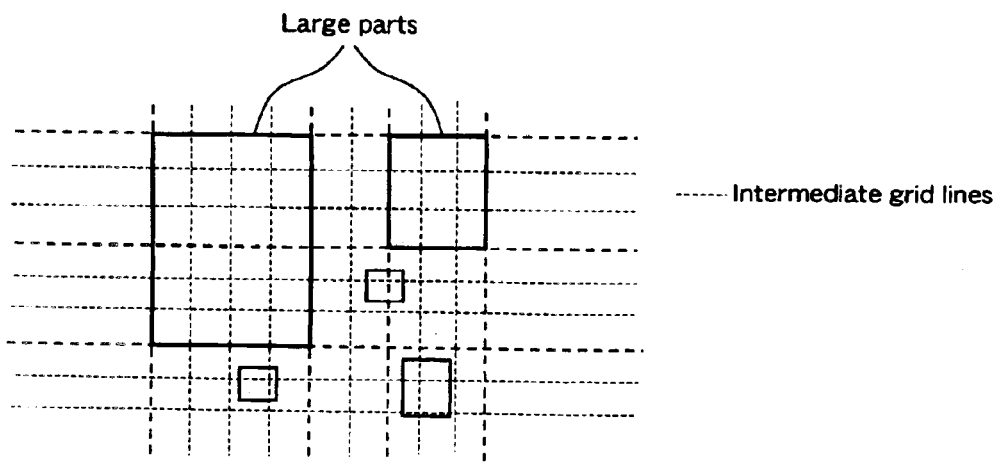
FIG. 31 is a view showing the state of parts with intermediate grids being arranged.

The state of parts in which intermediate grids are arranged in this manner is shown in FIG. 31. As shown in this figure, there coexist the parts having grids arranged and the parts having no grid arranged.

Figure 32A:
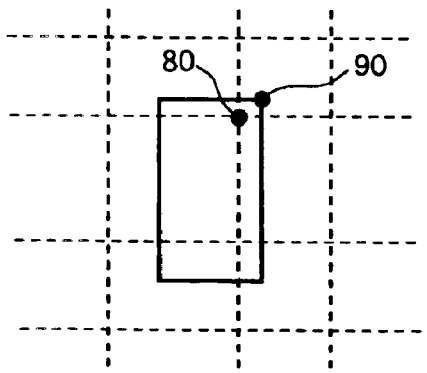
FIGS. 32(a) and 32(b) are views visually showing parallel displacement processing.
Figure 32B:
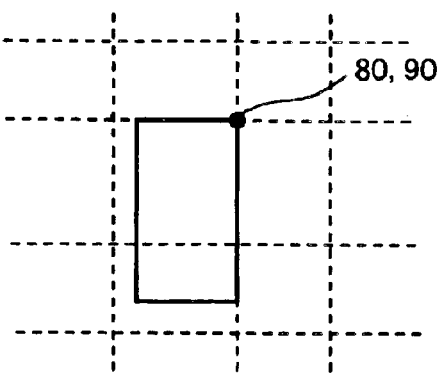

Then, those parts for which no grid is arranged are subjected to the parallel displacement processing and the shape and/or size changing processing so that they are set to the grid lines which have already been arranged (step S4000). This processing is performed by the final part changing part 41. First, the parallel displacement processing is carried out. Concretely, a part having no grid is moved so that one of the corner points (4 points in two dimensions and 8 points in three dimensions) of the part whose distance to a nearby grid is the shortest is superposed on the nearby grid. FIG. 32(a) and FIG. 32(b) show the parallel displacement processing in a visual manner, in which FIG. 32(a) illustrates the original arrangement of a part and FIG. 32(b) illustrates the arrangement of the part after parallel displacement thereof. As shown in FIGS. 32(a) and 32(b), the part is moved in a leftward and downward direction in such a manner that a corner 80 of the part is superposed on a grid 90.

Figure 33A:
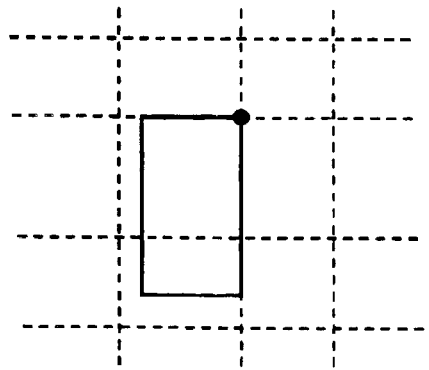
FIGS. 33(a) and 33(b) are views visually showing part shape and/or size modification processing.
Figure 33B:
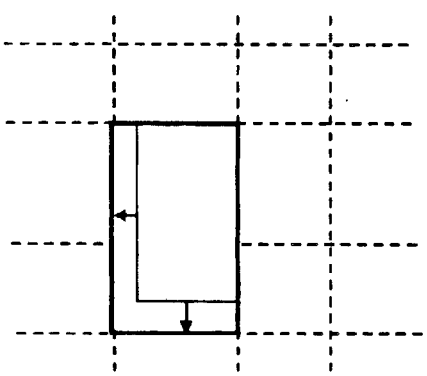

Subsequently, the shape and/or size of the part are changed or modified so that all the sides of the part are placed on their nearest grid lines. FIG. 33(a) and FIG. 33(b) show the part shape and/or size modification processing in a visual manner, in which FIG. 33(a) illustrates the state of the part immediately after the parallel displacement thereof has been carried out and FIG. 33(b) illustrates the state of the part after the shape and/or size of the part is changed or modified. After the shape and/or size of the part are modified, the specific heat and the heat transfer coefficient of the thus modified part are changed by a specific heat and heat transfer coefficient changing part 33c, as in the first embodiment, so that the thermal capacity and the heat transfer coefficient of the part may not change before and after the modification.

Figure 34A:
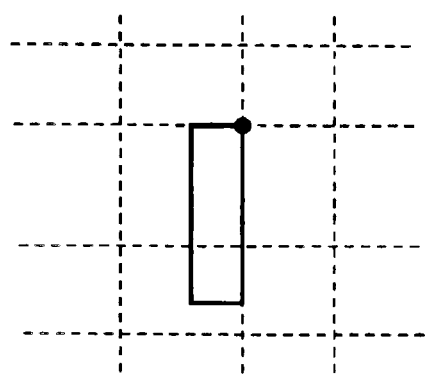
FIGS. 34(a) and 34(b) are views visually showing the part shape and/or size modification processing performed based on a set condition.

However, in cases where a part whose shape and/or size are to be modified has a shape and a size as shown in FIG. 34(a), if the shape and/or size of the part are modified so as to match all the sides thereof with their nearest grid lines, the size of the part becomes zero. In general, in case of fluid, volumes and planes can be recognized but points can not be recognized. On the other hand, heat can not be recognized even with planes. Accordingly, if the shape of the part is modified in such a manner, the accuracy in the analytical results will be greatly reduced.

Figure 34B:
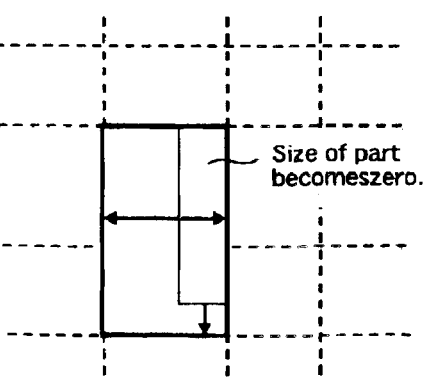

Thus, in order to avoid such a situation, the permission or non-permission of topological changes as shown in FIG. 13 for instance may be set in the third grid setting condition storage part 6e beforehand so that the shape and/or size of each part can be changed or modified according to scuh a permission/non-permission setting. In the example of FIG. 34(a), the size of the part is modified or changed to expand so as to prevent the part from becoming a plane or line, as shown in FIG. 34(b). Here, note that the specific heat and the heat transfer coefficient of the part thus modified are changed in this case, too.

Embodiment 4

In the first embodiment, since corners of an element (part) are matched with grid lines that are not removed among a grid pair, slight change of the sizes of the parts occurs, and volumes and areas thereof are changed. Such change of the areas and the volumes of the parts is preferably performed carefully for, for example, a part in a heat exhaust duct or a heat flow path on which a heat flow directly acts because the change affects a result of calculation significantly in the part or the heat flow path. In view of this point, in the fourth embodiment, in removing one of grid pairs and matching at least one corner of an element with the other ones of the grid pair that are not removed, a length of the element is changed also in a direction perpendicular to the grids to be removed, whereby areas and volumes of the elements are maintained.

Figure 35:
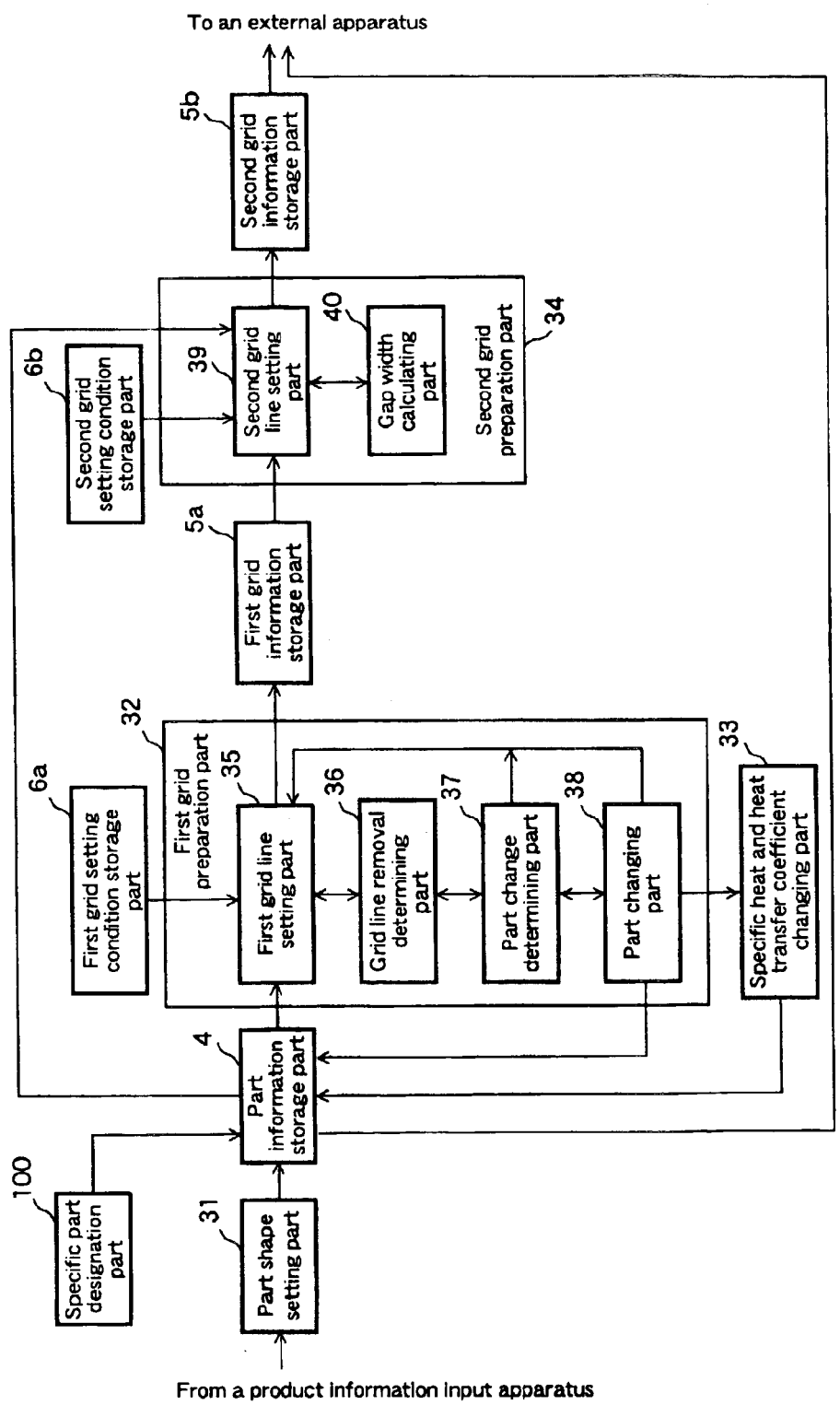
FIG. 35 is a block diagram showing a fourth embodiment.
Figure 36:
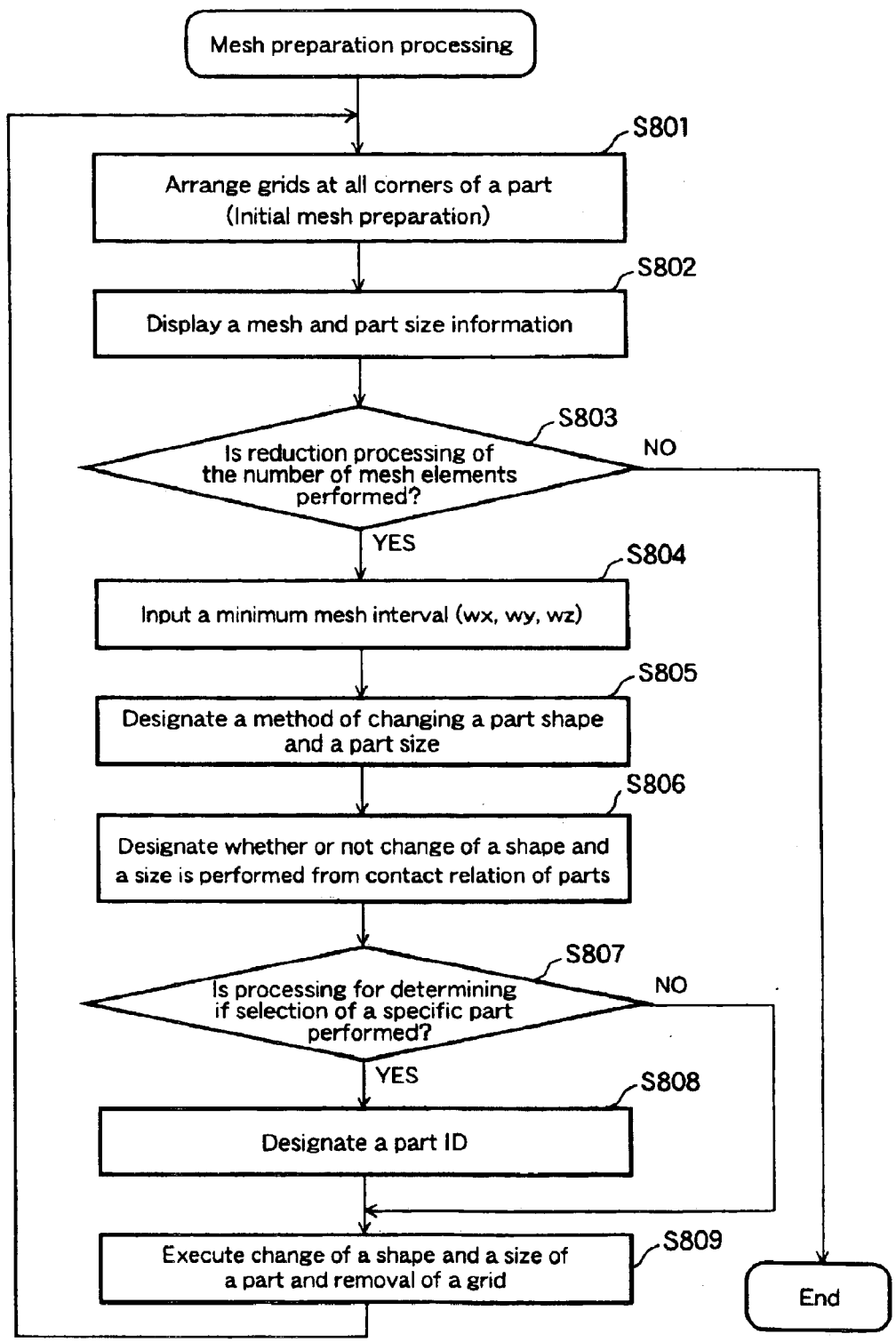
FIG. 36 is a flow chart showing operations of the fourth embodiment.

FIG. 35 shows a block diagram in the fourth embodiment. A specific part designation part 100 is provided which designates elements (parts) of which areas and volumes are maintained in removing grid lines. The other parts of the configuration are the same as those shown in FIG. 2. Operation of the fourth embodiment will be described below. FIG. 36 is a flow chart showing an entire operation in the fourth embodiment. Operations from step S801 to step S806 are the same as those from step S201 to step S206 of FIG. 8 showing the operations of the first embodiment, and descriptions of the operations will be omitted.

Figures 37A, 37B, 37C:
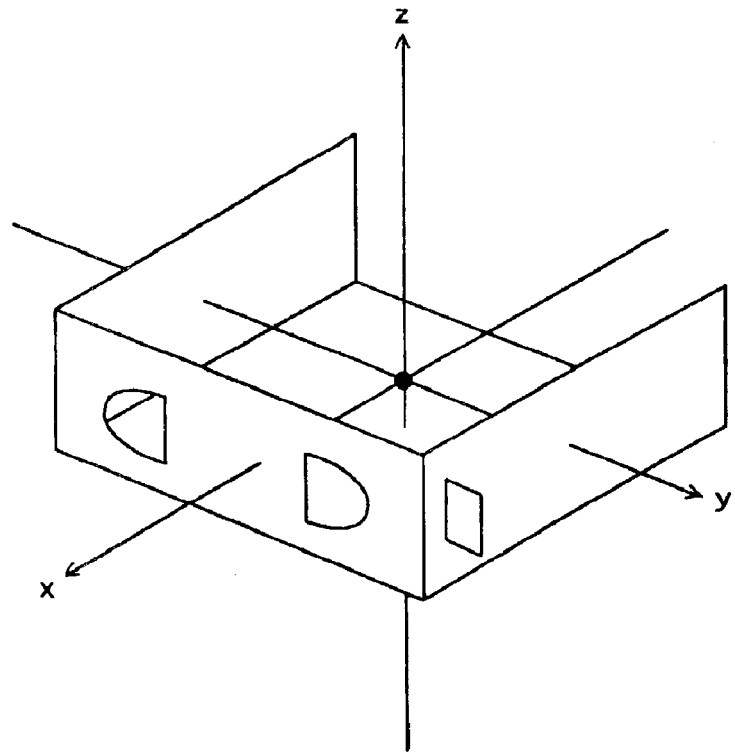
FIGS. 37(a) to 37(c) show indications on a designation screen for a specific part.

In step S807, it is determined whether or not parts (elements) of which areas and volumes are preserved (selection of specific parts). If the parts are to be selected, a part (including a space element) ID is designated (S808). As the selection of this part ID, parts of which areas and volumes are preserved are selected as specific parts while, for example, confirming shapes of the parts on a display from a parts list as shown in of FIG. 37(a). This figure shows a structure unit consisting of, for example, four parts displayed on a window, and a list of part names is displayed as shown in FIG. 37(b). The selection of specific parts is performed by properly selecting desired parts from the list of part names of FIG. 37(b). In addition, as shown in FIG. 37(c), in the selected parts, it can also be designated in which coordinate axis direction among a plurality of coordinate axis directions grid lines in grid line intervals formed in the direction are to be removed. This is convenient for a case in which, for example, grid lines are reduced only in a prescribed coordinate axis direction.

Further, in step S809 discussed later, lengths of elements are changed in coordinate axis directions perpendicular to a grid line interval direction (other coordinate axis directions perpendicular to a coordinate axis direction matching the grid line interval direction) according to change of lengths of parts in the grid line interval direction arising along with the removal of this grid line in order to preserve (maintain) the areas or the volumes of the parts. In this case, designation may be made such that the lengths are changed only in one direction among directions of a plurality of (e.g., two) coordinate axes and change of the lengths is regulated in the other directions. According to such a method of designation, such inconveniences that sizes (lengths) are changed in a prescribed direction of parts (direction in which lengths of parts should not be changed), which, for example, may reduce a cross section of a heat flow path and increase a calculation error of heat flow can be eliminated.

In addition, designation of an interval direction of grid lines (coordinate axis) in which grid lines to be removed are designed as described above is not performed and, for example, only grid lines forming a smallest grid line interval are removed for a certain element. In this way, removal of grid lines may not be performed for a new grid line interval arising along with a size change of parts in a direction perpendicular to the grid lines regardless of the grid line interval. Alternatively, if a size of the parts is changed (increased) in a direction perpendicular to the interval direction along with the removal of the grid lines, a grid line interval generated anew is calculated from an amount of the change (amount of increase). Then, only if the grid line interval is not equal to or smaller than a prescribed value, change for removing such grid lines and preserving areas and volumes of the parts may be permitted.

Moreover, alternatively, in the case in which sizes such as widths or heights of parts are increased in a certain coordinate axis direction, for example, if another grid line exists in a range in which either the widths or the heights are increased, the widths or the heights may be increased to the grid line and insufficiency of areas or volumes may be supplemented by increasing remaining components of the widths or the heights.

Further, in an embodiment discussed later, in the case in which sizes (lengths) of elements can be increased in two coordinate axis directions along with deletion of grid lines, if corners of the elements have already matched a grid of another element in any one of the coordinate axes, increase of sizes in the coordinate axis direction is regulated and only increase of sizes in the other coordinate axis direction is performed.

Figure 38:
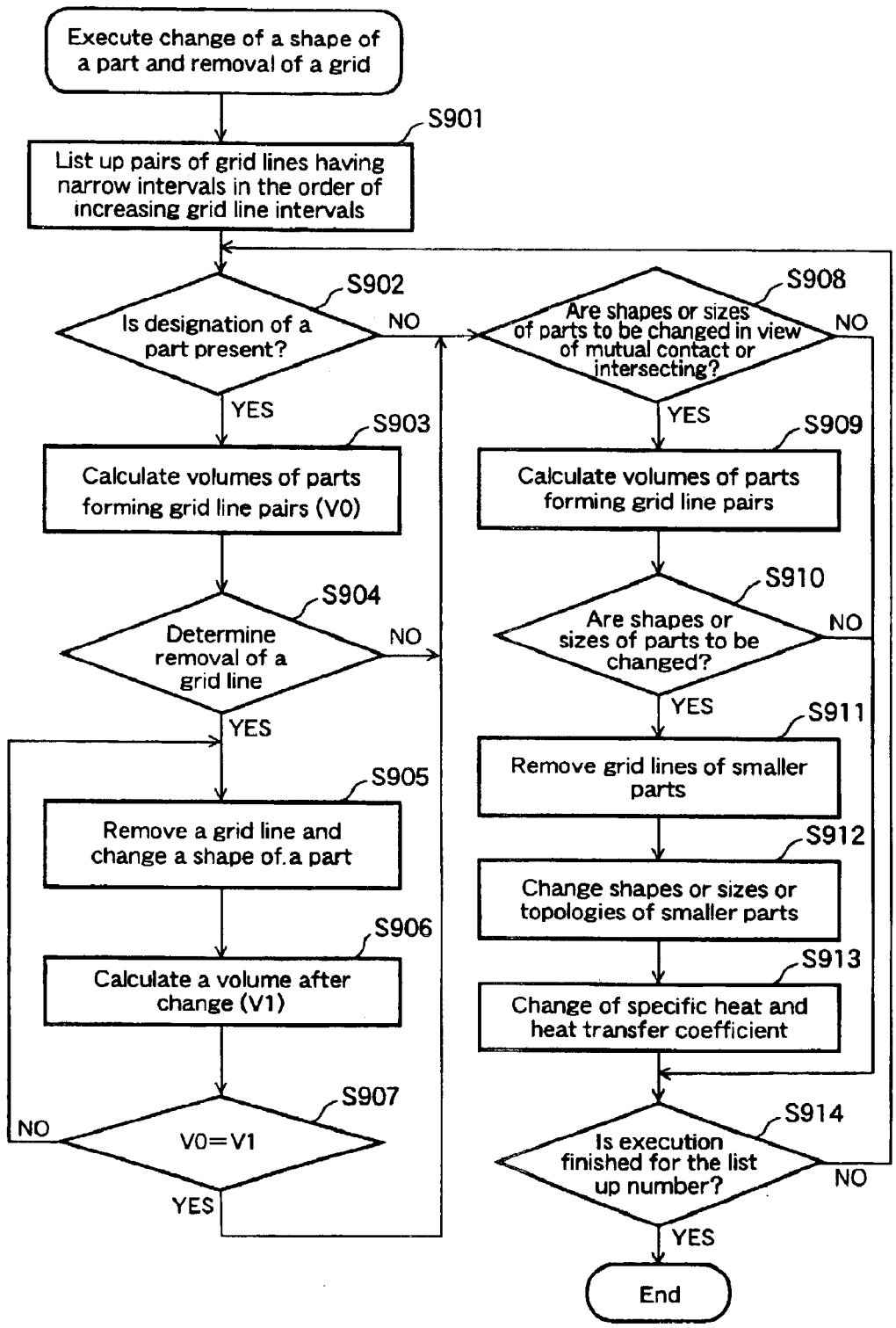
FIG. 38 is a flow chart describing change of shapes and sizes of parts and removal of grids.

In this way, when parts or spaces (specific parts) of which areas and volumes are preserved are selected (S808), change of shapes or sizes of parts or removal of grid lines is executed in accordance with the selection (S809). FIG. 38 is a flow chart describing the operation of step S809 in detail. First, pairs of grid lines having narrow intervals are listed up in the order of increasing grid line intervals (S901). Next, it is determined whether or not parts of which areas and volumes are maintained are designated (selected). If the parts are designated in a grid line pair (S902Y), volumes of parts constituting the grid line pair is calculated and, then, whether or not grid line removal is performed is determined (S904). In this determination, for example, it is determined if an interval of grid lines is not equal to or smaller than a prescribed value or a volume is equal to or smaller than a prescribed value. If it is not (S904N), the processing advances to step S908. If it is (if the grid line interval is equal to or smaller than the prescribed value or the volume is equal to or smaller than the prescribed value: S904Y), removal of the grid lines is performed and, at the same time, change of shapes of the parts is performed along with the removal (S905), and volumes after the change are calculated (S906). The shape changing processing of steps S905 and 906 is repeated until this volume equals to the volume calculated in step S903. Thereafter, the processing advances to step S908.

Figure 39A:
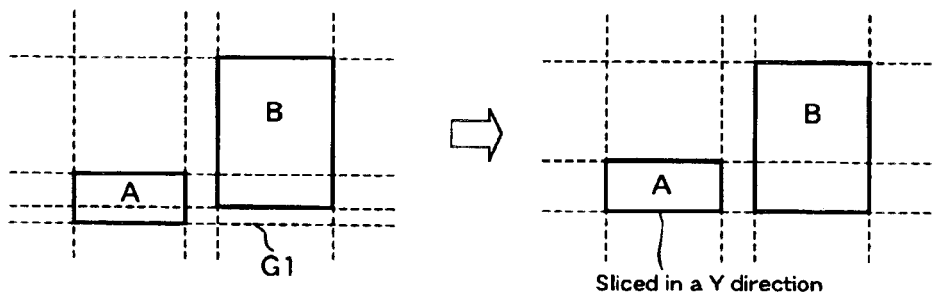
FIGS. 39(a) to 39(c) conceptually show change of shapes of parts.
Figure 39B:
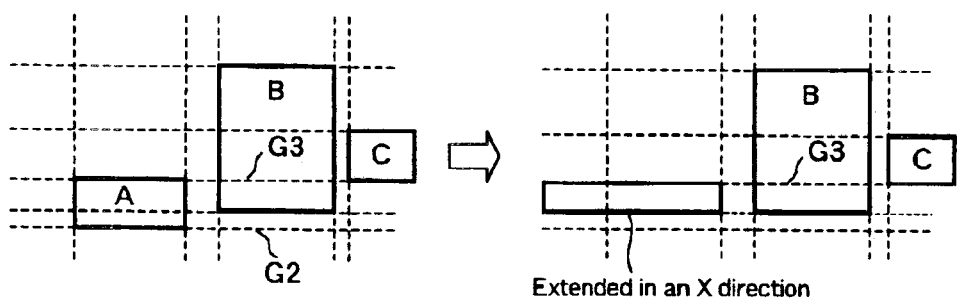

Since processing of step S908 to step S913 is the same as that of step S251 to step S256 in FIG. 18, it will not be described here. Further, the above-described operations from step S902 to step S913 are performed over the number of grid line pairs listed in step S901 to end the processing (S914). FIG. 39 conceptually shows change of shapes of parts. FIG. 39(a) shows the case in which an A part is moved (moved in parallel) in a y axis direction in preservation of a volume along with removing G1 that is one of the grid line pairs in preservation of a volume. FIG. 39(b) shows the case in which a size (length) of the part is changed (increased) only in an x axis direction of the A part along with removing G2 that is one of the grid line pairs in preservation of a volume. Since a grid line G3 is the same in the A part and a C part, the A part is not moved in the y axis direction nor the size (length) of the A part is not increased.

Figure 39C:
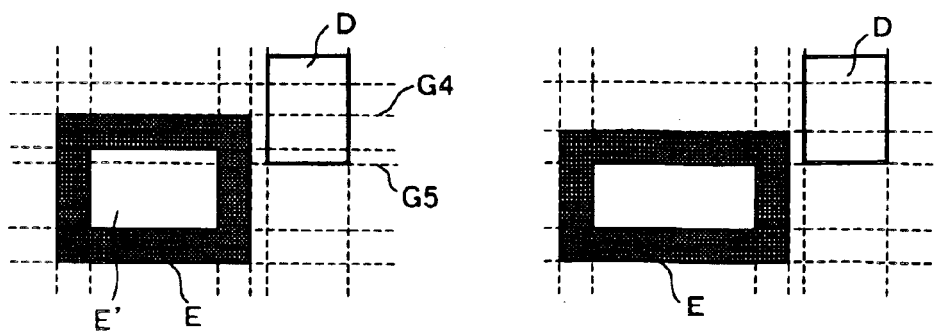

FIG. 39(c) shows the case in which a fluid space E' (or a surrounding part E forming the fluid space) is designated. For example, if a grid line G4 is removed and a grid line G5 is shared, the fluid space E' is extended in an x direction such that a cross section of the fluid space E' after the expansion equals that before the expansion. In this case, a sectional thickness (thickness) for the surrounding part E forming the fluid space is not changed.

As described above, according to the present invention, since grids are automatically removed to reduce mesh elements or, an analytical mesh is prepared while maintaining volumes and areas of elements even in removal of grids, calculation accuracy of analysis is improved and calculation time is shortened.

Although a variety of preferred embodiments according to the present invention have been described herein, it goes without saying that the present invention is not limited to the embodiments mentioned above, but applicable to the preparation of a mesh for use with not only thermal and/or fluid analyses but also like other analyses without departing from the scope or spirit of the present invention.

What is claimed is:

1. An analytical mesh preparation apparatus for preparing an analytical mesh by arranging grid lines in an analytical area to analyze prescribed physical quantities for an object composed of a plurality of elements, said apparatus comprising:

first grid line arranging unit for arranging grid lines at corners of said plurality of elements;

interval calculation unit for calculating the intervals between adjacent ones of said plurality of grid lines arranged by said first grid line arranging unit;

first determining unit for determining those grid lines which are to be removed based on the result of the calculation carried out by said interval calculation unit;

removal unit for removing said grid lines based on the result of the determination made by said first determining unit; and changing unit for changing at least one of the shapes and sizes of said elements in accordance with the removal of said grid lines by said removal unit.

2. The analytical mesh preparation apparatus according to claim 1, further comprising conversion unit for converting the shapes of said elements into hexahedrons each of which circumscribes a corresponding one of said elements, wherein said first grid line arranging unit arranges said grid lines at corners of said elements converted into the hexahedrons by said conversion unit.

3. The analytical mesh preparation apparatus according to claim 2, wherein when said elements are constituted by one or more polygons, said conversion unit acquires the maximum and minimum coordinates of each of said polygons in the directions of three orthogonal axes and forms, as said hexahedrons circumscribing said corresponding elements, hexahedrons with the maximum and minimum coordinates as their vertices.

4. The analytical mesh preparation apparatus according to claim 1, wherein said first determining unit determines, as a grid line to be removed, one of each pair of grid lines whose interval is equal to or smaller than a prescribed value.

5. The analytical mesh preparation apparatus according to claim 4, wherein said first determining unit determines, as a grid line to be removed, that one of each pair of grid lines whose interval is equal to or smaller than the prescribed value, which is formed by a smaller one of said elements from which said pair of grid lines are formed.

6. The analytical mesh preparation apparatus according to claim 1, further comprising second determining unit for determining the grid lines which are to be removed based on prescribed information on said elements, wherein said removal unit removes said grid lines based on the result of the determination made by said second determining unit in addition to the result of the determination made by said first determining unit.

7. The analytical mesh preparation apparatus according to claim 6, wherein said prescribed information on said elements includes size information on the sizes of said elements or arrangement information on the arrangements of said elements.

8. The analytical mesh preparation apparatus according to claim 1, further comprising second grid line arranging unit for arranging, after changing of at least one of the shapes and sizes of said elements, additional grid lines in such a manner that all the grid lines are arranged at equal intervals or differences in the intervals between adjacent ones of all the grid lines are within a prescribed range.

9. The analytical mesh preparation apparatus according to claim 1, further comprising specific heat changing unit for changing the specific heat of each of said elements of which at least one of the shapes and sizes have been changed by said changing unit in such a manner that the thermal capacity of each of said elements becomes the same before and after the changing thereof.

10. The analytical mesh preparation apparatus according to claim 1, further comprising heat transfer coefficient changing unit for changing the heat transfer coefficient of each of said elements of which at least one of the shapes and sizes have been changed by said changing unit in such a manner that the amount of heat transmission of each of said elements becomes the same before and after the changing thereof.

11. The analytical mesh preparation apparatus according to claim 1,
wherein said changing unit changes only shapes of said elements without changing areas or volumes thereof in accordance with the removal of grid lines by said removal unit.

12. The analytical mesh preparation apparatus according to claim 11,
wherein said elements of which only shapes are changed by said changing unit without changing areas or volumes thereof are designated based on designation information.

13. The analytical mesh preparation apparatus according to claim 12, further comprising input designating unit for inputting said designation information.

14. The analytical mesh preparation apparatus according to claim 11,
wherein said first determining unit determines, as grid lines to be removed, grid lines that form grid line intervals formed in a prescribed coordinate axis direction among a plurality of grid lines arranged for one element, and said changing unit changes a lengths of said element in other coordinate axis directions perpendicular to said prescribed coordinate axis direction in order to maintain an area or a volume of said element in accordance with change of the length of said element in a direction of the grid line interval which arises along with the removal of said grid lines.

15. The analytical mesh preparation apparatus according to claim 14,
wherein, in the case in which the length of said element is changed in said other coordinate axis directions, if there are at least two said other coordinate axis directions and, in one coordinate axis direction thereof, there is a grid line of another element matching a corner of said element, said changing unit changes the length of said element in the other coordinate axis direction different from said one coordinate axis direction.

16. The analytical mesh preparation apparatus according to claim 14,
wherein said first determining unit determines said prescribed coordinate axis direction based on the interval of grid lines calculated by said interval calculation unit.

17. The analytical mesh preparation apparatus according to claim 14,
wherein said first determining unit determines said prescribed coordinate axis direction based on designated information.

18. The analytical mesh preparation apparatus according to claim 11,
wherein said element is a part or a space relating to a heat flow path.

19. An analytical mesh preparation apparatus for preparing an analytical mesh by arranging grid lines in an analytical area to analyze prescribed physical quantities for an object composed of a plurality of elements, said apparatus comprising:
first grid line arranging unit for arranging grid lines at corners of said plurality of elements;
interval calculation unit for calculating the intervals between adjacent ones of said plurality of grid lines arranged by said first grid line arranging unit;
first determining unit for determining those grid lines which are to be removed based on the result of the calculation carried out by said interval calculation unit;
removal unit for removing said grid lines based on the result of the determination made by said first determining unit; and
arrangement changing unit for changing the arrangements of said elements in accordance with the removal of said grid lines by said removal unit.

20. An analytical mesh preparation method for preparing an analytical mesh by arranging grid lines in an analytical area to analyze prescribed physical quantities for an object composed of a plurality of elements, said method comprising:
a grid line arranging step of arranging grid lines at corners of said plurality of elements;
an interval calculation step of calculating the intervals between adjacent ones of said plurality of grid lines arranged in said first grid line arranging step;
a determining step of determining those grid lines which are to be removed based on the result of the calculation carried out in said interval calculation step;
a removal step of removing said grid lines based on the result of the determination made in said determining step; and
a changing step of changing at least one of the shapes and sizes of said elements in accordance with the removal of said grid lines in said removal step.

21. An analytical mesh preparation method for preparing an analytical mesh by arranging grid lines in an analytical area to analyze prescribed physical quantities for an object composed of a plurality of elements, said method comprising:

a grid line arranging step of arranging grid lines at corners of said plurality of elements;

an interval calculation step of calculating the intervals between adjacent ones of said plurality of grid lines arranged in said first grid line arranging step;

a determining step of determining those grid lines which are to be removed based on the result of the calculation carried out in said interval calculation step;

a removal step of removing said grid lines based on the result of the determination made in said determining step; and an arrangement changing step of changing the arrangements of said elements in accordance with the removal of said grid lines in said removal step.

22. An analytical mesh preparation method for preparing an analytical mesh by arranging grid lines in an analytical area to analyze prescribed physical quantities for an object composed of a plurality of elements, comprising:

a grid line arranging step of arranging grid lines at corners of said plurality of elements;

an interval calculating step of calculating the intervals between adjacent ones of said plurality of grid lines arranged by said grid line arranging step;

a determining step of determining those grid lines which are to be removed based on the result of the calculation carried out by said interval calculating step;

a removing step of removing said grid lines based on the result of the determination made by said determining step; and a changing step of changing only the shapes without changing areas or volumes of said elements in accordance with the removal of the grid lines by said removing step.

23. An analytical mesh preparation program for making a computer perform the processing of preparing an analytical mesh by arranging grid lines in an analytical area to analyze prescribed physical quantities for an object composed of a plurality of elements, said program being adapted to make the computer execute:

a grid line arranging step of arranging grid lines at corners of said plurality of elements;

an interval calculation step of calculating the intervals between adjacent ones of said plurality of grid lines arranged in said grid line arranging step;

a determining step of determining those grid lines which are to be removed based on the result of the calculation carried out in said interval calculation step;

a removal step of removing said grid lines based on the result of the determination made in said determining step; and a changing step of changing at least one of the shapes and sizes of said elements in accordance with the removal of said grid lines in said removal step.

24. An analytical mesh preparation program for making a computer perform the processing of preparing an analytical mesh by arranging grid lines in an analytical area to analyze prescribed physical quantities for an object composed of a plurality of elements, said program being adapted to make the computer execute:

a grid line arranging step of arranging grid lines at corners of said plurality of elements;

an interval calculation step of calculating the intervals between adjacent ones of said plurality of grid lines arranged in said grid line arranging step;

a determining step of determining those grid lines which are to be removed based on the result of the calculation carried out in said interval calculation step;

a removal step of removing said grid lines based on the result of the determination made in said determining step; and an arrangement changing step of changing the arrangements of said elements in accordance with the removal of said grid lines in said removal step.

25. An analytical mesh preparation program for causing a computer to execute processing for preparing an analytical mesh by arranging grid lines in an analytical area to analyze prescribed physical quantities for an object composed of a plurality of elements, the program causing the computer to execute:

a grid line arranging step of arranging grid lines at corners of said plurality of elements;

an interval calculating step of calculating the intervals between adjacent ones of said plurality of grid lines arranged by said grid line arranging step;

a determining step of determining those grid lines which are to be removed based on the result of the calculation carried out by said interval calculating step;

a removing step of removing said grid lines based on the result of the determination made by said determining step; and a changing step of changing only the shapes without changing areas or volumes of said elements in accordance with the removal of the grid lines by said removing step.

* * * * *